(12) United States Patent
Brown et al.

(10) Patent No.: US 9,520,742 B2
(45) Date of Patent: Dec. 13, 2016

(54) MONITORING SYSTEM AND METHOD

(71) Applicant: Hubbell Incorporated, Shelton, CT (US)

(72) Inventors: Philip Gregory Brown, Vincentia (AU); Alec M. Mercer, New Holland, PA (US); Jeff T. Reid, Sinking Spring, PA (US)

(73) Assignee: Hubbell Incorporated, Shelton, CT (US)

( * ) Notice: Subject to any disclaimer, the term of this patent is extended or adjusted under 35 U.S.C. 154(b) by 127 days.

(21) Appl. No.: 14/323,659

(22) Filed: Jul. 3, 2014

(65) Prior Publication Data

US 2016/0005294 A1    Jan. 7, 2016

(51) Int. Cl.
G08B 21/00 (2006.01)
H02J 9/00 (2006.01)
G08B 29/10 (2006.01)

(52) U.S. Cl.
CPC ........ *H02J 9/00* (2013.01); *G08B 29/10* (2013.01)

(58) Field of Classification Search
None
See application file for complete search history.

(56) References Cited

U.S. PATENT DOCUMENTS

| | | | |
|---|---|---|---|
| 4,059,065 A | 11/1977 | Clark et al. | |
| 4,265,535 A | 5/1981 | Pitt | |
| 4,267,777 A | 5/1981 | Theurer et al. | |
| 4,647,371 A | 3/1987 | Schmitt et al. | |
| 4,649,281 A | 3/1987 | Schmitt et al. | |
| 4,872,118 A | 10/1989 | Naidenov et al. | |
| 4,935,856 A | 6/1990 | Dragoon | |
| 4,945,280 A | 7/1990 | Beghelli | |
| 4,959,761 A | 9/1990 | Critelli et al. | |
| 5,327,328 A | 7/1994 | Simms et al. | |
| 5,349,504 A | 9/1994 | Simms et al. | |
| 5,396,086 A | 3/1995 | Engels et al. | |
| 5,487,088 A | 1/1996 | Weltz et al. | |
| 5,765,940 A | 6/1998 | Levy et al. | |

(Continued)

FOREIGN PATENT DOCUMENTS

CN    101932160 A    12/2010
GB    2307321 A    5/1997

*Primary Examiner* — Julie Lieu
(74) *Attorney, Agent, or Firm* — Dickinson Wright PLLC

(57) ABSTRACT

System and method for monitoring electrical devices such as luminaires, including ballast and/or battery powered lighting components, for variety of fault conditions from central location utilize monitoring unit that interfaces with host lighting fixture or luminaire to allow status of host to be remotely monitored. Monitoring unit can interface with host in fully galvanically isolated manner using current transformers allowing host lighting fixture to be monitored in the least intrusive manner. Monitoring unit can be seamlessly fitted to new luminaires or existing luminaires. Current transformer interface has minimal effect on host ballast functionality and operation. Monitoring system may include a plurality of monitoring units multi-dropped on a single field bus network or in a power line communication. Power for monitoring unit can be derived from field bus network or power line. Operating parameters and addressing information of monitoring unit may be configured via interface using laptop or PC.

30 Claims, 19 Drawing Sheets

(56) References Cited

U.S. PATENT DOCUMENTS

| | | | |
|---|---|---|---|
| 5,907,180 A | 5/1999 | Johansson et al. | |
| 6,127,784 A | 10/2000 | Grossman et al. | |
| 6,140,771 A | 10/2000 | Luger et al. | |
| 6,153,985 A | 11/2000 | Gorssman | |
| 6,181,086 B1 * | 1/2001 | Katyl | H05B 37/0254 315/291 |
| 6,188,933 B1 | 2/2001 | Hewlett et al. | |
| 6,211,623 B1 | 4/2001 | Wilhelm et al. | |
| 6,281,784 B1 | 8/2001 | Redgate et al. | |
| 6,292,339 B1 | 9/2001 | Brooks | |
| 6,310,445 B1 | 10/2001 | Kashaninejad | |
| 6,329,754 B1 | 12/2001 | Daub et al. | |
| 6,388,396 B1 | 5/2002 | Katyl et al. | |
| 6,400,095 B1 | 6/2002 | Primisser et al. | |
| 6,425,678 B1 | 7/2002 | Verdes et al. | |
| 6,435,459 B1 | 8/2002 | Sanderson et al. | |
| 6,533,446 B2 | 3/2003 | Chen et al. | |
| 6,534,932 B1 | 3/2003 | Klinkenberg | |
| 6,543,277 B2 | 4/2003 | Koch et al. | |
| 6,622,053 B1 | 9/2003 | Hewlett et al. | |
| 6,683,419 B2 | 1/2004 | Kriparos | |
| 6,722,191 B2 | 4/2004 | Koch et al. | |
| 6,736,528 B2 | 5/2004 | Hewlett et al. | |
| 6,826,514 B1 | 11/2004 | Antico et al. | |
| 6,948,829 B2 | 9/2005 | Verdes et al. | |
| 7,009,829 B2 | 3/2006 | Lentz et al. | |
| 7,048,425 B2 | 5/2006 | You et al. | |
| 7,095,187 B2 | 8/2006 | Young | |
| 7,119,494 B2 | 10/2006 | Hui et al. | |
| 7,119,500 B2 | 10/2006 | Young | |
| 7,119,501 B2 | 10/2006 | Young | |
| 7,120,560 B2 | 10/2006 | Williams et al. | |
| 7,132,805 B2 | 11/2006 | Young | |
| 7,160,004 B2 | 1/2007 | Peck | |
| 7,208,881 B2 | 4/2007 | Young | |
| 7,230,752 B2 | 6/2007 | Hewlett et al. | |
| 7,281,818 B2 | 10/2007 | You et al. | |
| 7,281,821 B2 | 10/2007 | Martin et al. | |
| 7,329,034 B2 | 2/2008 | Verdes et al. | |
| 7,379,230 B2 | 5/2008 | Hewlett et al. | |
| 7,427,731 B2 | 9/2008 | Gerhard et al. | |
| 7,432,643 B2 | 10/2008 | Haba et al. | |
| 7,468,579 B2 | 12/2008 | Hiraki | |
| 7,510,303 B2 | 3/2009 | Jonsson et al. | |
| 7,511,415 B2 | 3/2009 | Haba | |
| 7,521,873 B2 | 4/2009 | Hui et al. | |
| 7,568,821 B2 | 8/2009 | Peck et al. | |
| 7,586,273 B2 | 9/2009 | Curran | |
| 7,602,057 B2 | 10/2009 | Curran et al. | |
| 7,604,380 B2 | 10/2009 | Burton et al. | |
| 7,604,384 B2 | 10/2009 | Peek | |
| 7,619,362 B2 | 11/2009 | Olsen et al. | |
| 7,626,345 B2 | 12/2009 | Young | |
| 7,635,953 B2 | 12/2009 | Tumula et al. | |
| 7,643,204 B2 | 1/2010 | Hewlett et al. | |
| 7,658,513 B2 | 2/2010 | Peck | |
| 7,731,384 B2 | 6/2010 | Curran | |
| 7,758,210 B2 | 7/2010 | Peck | |
| 7,768,215 B1 | 8/2010 | Shiwei et al. | |
| 7,777,322 B2 | 8/2010 | Curran et al. | |
| 7,777,424 B2 | 8/2010 | Hebborn | |
| 7,798,672 B2 | 9/2010 | Routledge | |
| 7,810,963 B2 | 10/2010 | Peck | |
| 7,817,063 B2 | 10/2010 | Hawkins et al. | |
| 7,832,908 B2 | 11/2010 | Peck et al. | |
| 7,833,034 B2 | 11/2010 | Connell | |
| 7,874,703 B2 | 1/2011 | Shastry et al. | |
| 7,880,957 B2 | 2/2011 | Hewlett et al. | |
| 7,918,582 B2 | 4/2011 | Curran et al. | |
| 7,997,761 B2 | 8/2011 | Peck et al. | |
| 8,018,179 B2 | 9/2011 | Frucht | |
| 8,023,928 B2 | 9/2011 | Fulks, III et al. | |
| 8,029,162 B2 | 10/2011 | Curran et al. | |
| 8,063,576 B2 | 11/2011 | Routledge | |
| 8,066,400 B2 | 11/2011 | Curran et al. | |
| 8,084,952 B1 | 12/2011 | Shiwei et al. | |
| 8,147,099 B2 | 4/2012 | Thornton | |
| 8,198,824 B2 | 6/2012 | Yufuku et al. | |
| 8,210,723 B2 | 7/2012 | Peck et al. | |
| 8,226,427 B2 | 7/2012 | Connell | |
| 8,231,245 B2 | 7/2012 | Weimer et al. | |
| 8,248,203 B2 | 8/2012 | Hanwright et al. | |
| 8,290,710 B2 | 10/2012 | Cleland et al. | |
| 8,300,302 B2 | 10/2012 | Hewlett et al. | |
| 8,328,388 B2 | 12/2012 | Curran et al. | |
| 8,410,402 B2 | 4/2013 | Burton | |
| 8,432,029 B2 | 4/2013 | Curran et al. | |
| 8,442,785 B2 | 5/2013 | Walters et al. | |
| 2001/0047212 A1 | 11/2001 | Hewlett et al. | |
| 2002/0029626 A1 | 3/2002 | Koch et al. | |
| 2002/0114170 A1 | 8/2002 | Chen et al. | |
| 2002/0145393 A1 | 10/2002 | Hui et al. | |
| 2003/0048634 A1 | 3/2003 | You et al. | |
| 2003/0150261 A1 | 8/2003 | Koch et al. | |
| 2003/0176971 A1 | 9/2003 | Daniels et al. | |
| 2003/0234621 A1 | 12/2003 | Kriparos | |
| 2004/0085764 A1 | 5/2004 | Martin et al. | |
| 2004/0100749 A1 | 5/2004 | Lentz et al. | |
| 2004/0160198 A1 | 8/2004 | Hewlett et al. | |
| 2004/0174716 A1 | 9/2004 | Verdes et al. | |
| 2004/0246741 A1 | 12/2004 | You et al. | |
| 2005/0068771 A1 | 3/2005 | You et al. | |
| 2005/0093457 A1 | 5/2005 | Hamblin | |
| 2005/0122065 A1 | 6/2005 | Young | |
| 2005/0128744 A1 | 6/2005 | You et al. | |
| 2005/0134162 A1 | 6/2005 | Hiraki | |
| 2005/0156531 A1 | 7/2005 | Young | |
| 2005/0162864 A1 | 7/2005 | Verder et al. | |
| 2005/0212402 A1 | 9/2005 | Haba et al. | |
| 2006/0022614 A1 | 2/2006 | Young | |
| 2006/0028155 A1 | 2/2006 | Young | |
| 2006/0043860 A1 | 3/2006 | Haba | |
| 2006/0044491 A1 | 3/2006 | Haba | |
| 2006/0186819 A1 | 8/2006 | Young | |
| 2006/0187532 A1 | 8/2006 | Hewlett et al. | |
| 2006/0198141 A1 | 9/2006 | Peck et al. | |
| 2006/0198148 A1 | 9/2006 | Peck | |
| 2006/0209541 A1 | 9/2006 | Peck | |
| 2006/0226956 A1 | 10/2006 | Young et al. | |
| 2006/0255705 A1 | 11/2006 | Young | |
| 2007/0035227 A1 | 2/2007 | Haba et al. | |
| 2007/0040518 A1 | 2/2007 | Young | |
| 2007/0052373 A1 | 3/2007 | Hui et al. | |
| 2007/0133213 A1 | 6/2007 | Peck | |
| 2007/0273891 A1 | 11/2007 | Gerhard et al. | |
| 2008/0225372 A1 | 9/2008 | Hewlett et al. | |
| 2008/0247170 A1 | 10/2008 | Peck | |
| 2009/0002985 A1 | 1/2009 | Peek et al. | |
| 2009/0039803 A1 | 2/2009 | Olsen et al. | |
| 2009/0080198 A1 | 3/2009 | Thorton | |
| 2009/0181636 A1 | 7/2009 | Fulks, III et al. | |
| 2009/0318000 A1 | 12/2009 | Connell | |
| 2010/0066484 A1 | 3/2010 | Hanwright | |
| 2010/0072917 A1 | 3/2010 | O'Gorman et al. | |
| 2010/0156312 A1 | 6/2010 | Yufuku et al. | |
| 2010/0207539 A1 | 8/2010 | Haeusser | |
| 2011/0090685 A1 | 4/2011 | Peck | |
| 2011/0121737 A1 | 5/2011 | Hewlett et al. | |
| 2011/0270797 A1 | 11/2011 | Adams et al. | |
| 2011/0280019 A1 | 11/2011 | Zimmer et al. | |
| 2012/0001565 A1 | 1/2012 | Hu et al. | |
| 2012/0039613 A1 | 2/2012 | Routhledge | |
| 2012/0262919 A1 | 10/2012 | Peck | |
| 2012/0319588 A1 | 12/2012 | Sid | |
| 2013/0050796 A1 | 2/2013 | Hewlett et al. | |
| 2015/0163881 A1 * | 6/2015 | Pederson | H05B 33/0863 315/154 |
| 2015/0204561 A1 * | 7/2015 | Sadwick | F24F 11/006 236/1 C |

* cited by examiner

SECTION A-A

MONITORING SYSTEM AND METHOD

BACKGROUND OF THE INVENTION

1. Field of the Invention

Generally, the present invention is in the field of lighting applications, and more specifically relates to monitoring of electrical devices such as luminaires, including ballast and/or battery powered lighting components, for a variety of fault conditions from a central location.

2. Discussion of the Background of the Invention

Conventional luminaires, such as emergency fluorescent luminaire are provided as an integrated unit consisting of a mains supplied ballast for supplying the fluorescent lamps in normal situations, a battery pack, an emergency circuit that charges the battery and powers the lamp in an emergency situation, and a micro-controller based supervisory circuit that controls the charging. The unit can be connected to an external switch that can inhibit the emergency functions when the mains power is on or off and restart the emergency functions with or without mains power being applied.

The micro-controller also monitors luminaires emergency functions and can perform a basic self test to check battery emergency operation and lamp condition. Results of the self test and emergency unit status are conventionally displayed by flashing patterns of red and green LEDs disposed on the luminaires.

However, in order to perform a more complete operational check on conventional luminaires requires physically checking luminaire's components and connections. Furthermore, the status of an individual luminaire in an array of luminaires is not easily communicated to a central location. Therefore, a need exists for continuously monitoring luminaire status and operation without interfering with its function, and communicating the results of monitoring of individual luminaires to a central location.

SUMMARY OF THE INVENTION

Exemplary embodiments of the present invention address at least the above problems and/or disadvantages and provide at least the advantages described below.

Exemplary embodiments of the present invention provide systems and methods comprising a monitoring unit that interfaces with a host lighting fixture or luminaire to allow the status of the host to be remotely monitored.

According to an exemplary implementation, monitoring the status of the host comprises digital and/or analog monitoring of any one or more of mains lamp on status, inhibit input status, emergency lamp current, and battery charge current.

According to another exemplary implementation, systems and methods comprise a monitoring unit interfacing with mains only and standby emergency lighting fixtures.

According to yet another exemplary implementation, systems and methods comprise a monitoring unit communicating with central monitoring equipment via a two-wire field bus network.

According to yet another exemplary implementation, systems and methods comprise a monitoring unit communicating with central monitoring equipment via a power line communication.

According to yet another exemplary implementation, systems and methods comprise a monitoring unit communicating with central monitoring equipment via wired or wireless communication.

According to yet another exemplary implementation, systems and methods comprise a monitoring unit communicating with central monitoring equipment via wireless communication including wireless mesh network, web-based communication, blue tooth, or any other short-range or long-range radio frequency (RF) communication.

Other exemplary embodiments of the present invention provide systems and methods comprising a monitoring unit interfacing with a host lighting fixture or luminaire in a galvanically isolated manner.

According to yet other exemplary implementations of embodiments of the present invention, a monitoring unit interfaces with a host lighting fixture or luminaire using current transformers allowing the host lighting fixture to be monitored without compromising wiring insulation.

According to yet other exemplary implementations of embodiments of the present invention, a host luminaire monitoring system and method provide monitoring using a current transformer interface having minimal effect on host ballast functionality and operation.

According to yet other exemplary implementations of embodiments of the present invention, a host luminaire monitoring and control system and method provide monitoring using a current transformer interface having minimal effect on host ballast functionality and operation, and further provide host luminaire control functionality based on results of monitoring, or external control via bus interface or power line communication, or both.

According to yet other exemplary implementations of embodiments of the present invention, a host luminaire monitoring system and method provide monitoring functionality seamlessly fitted to new luminaires or retrofitted to existing luminaires without impact on certification and approvals of the host luminaire.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1A:
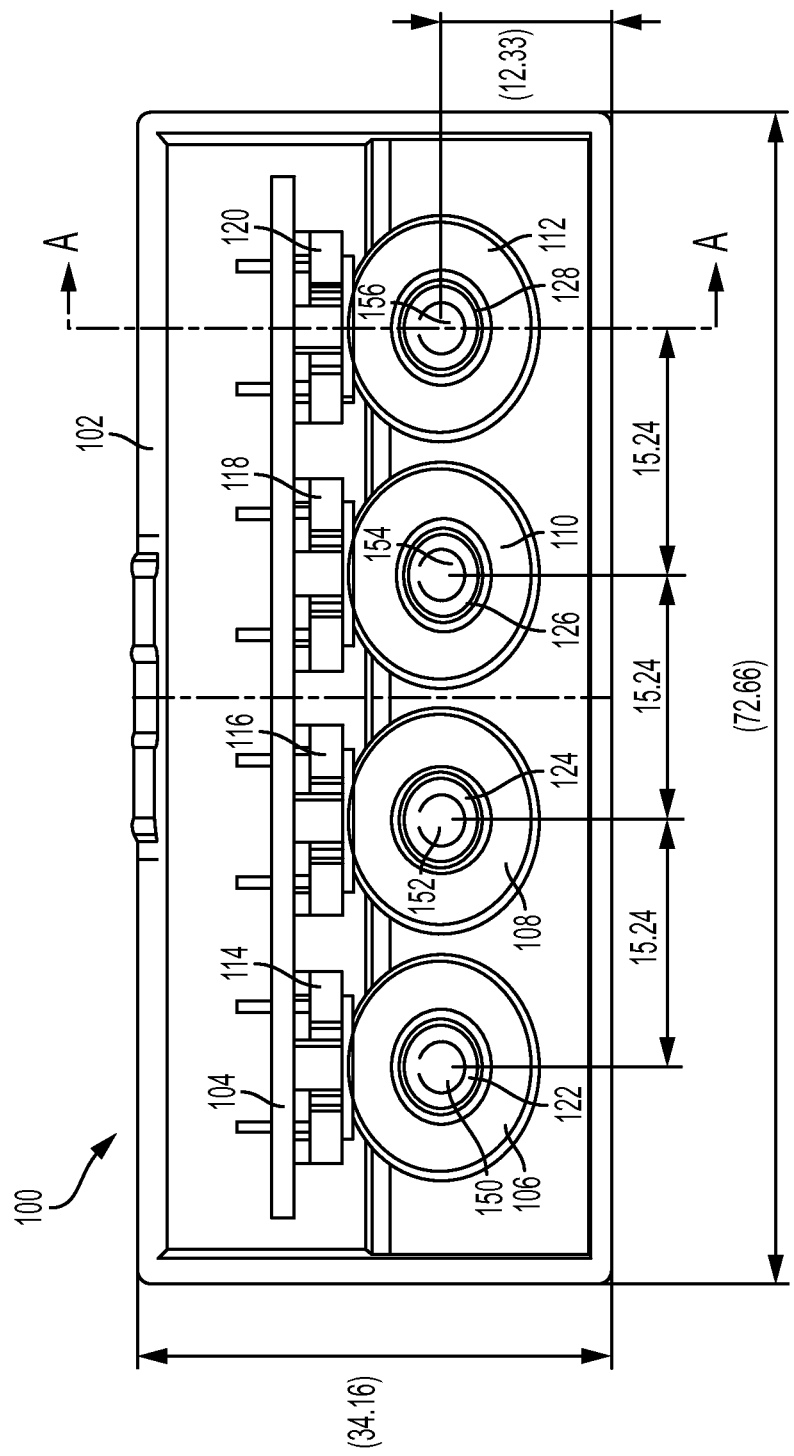
FIGS. 1A, 1B, 1C, 1D, 1E and 1F are structure diagrams illustrating multiple views of a monitoring module or unit according to an exemplary embodiment of the present invention.
Figure 1B:
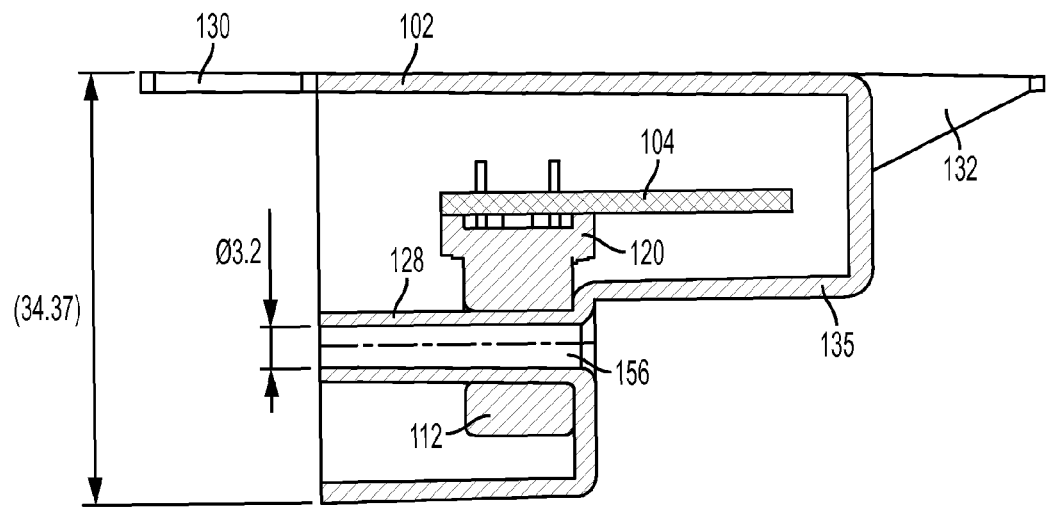
Figure 1C:
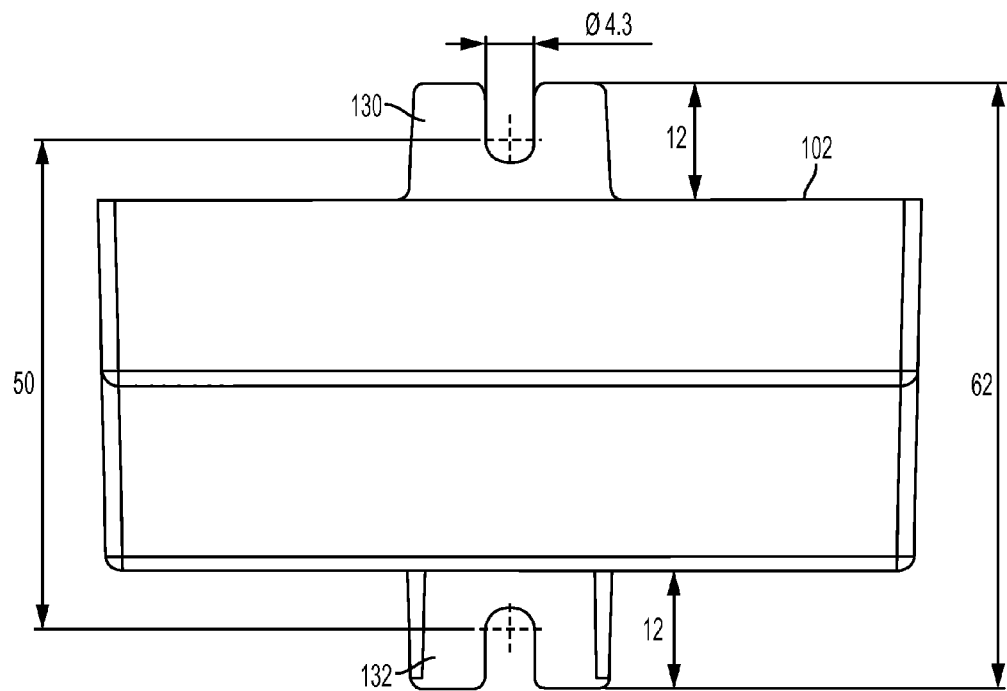
Figure 1D:
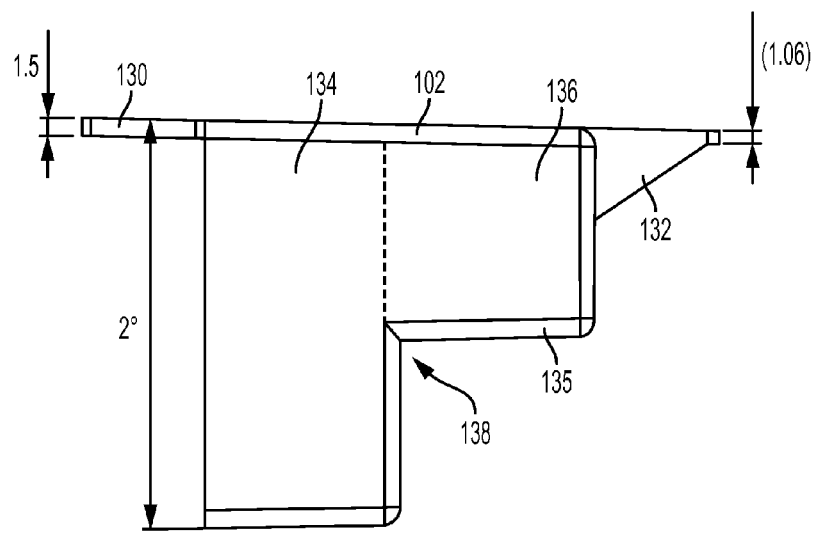
Figure 1E:
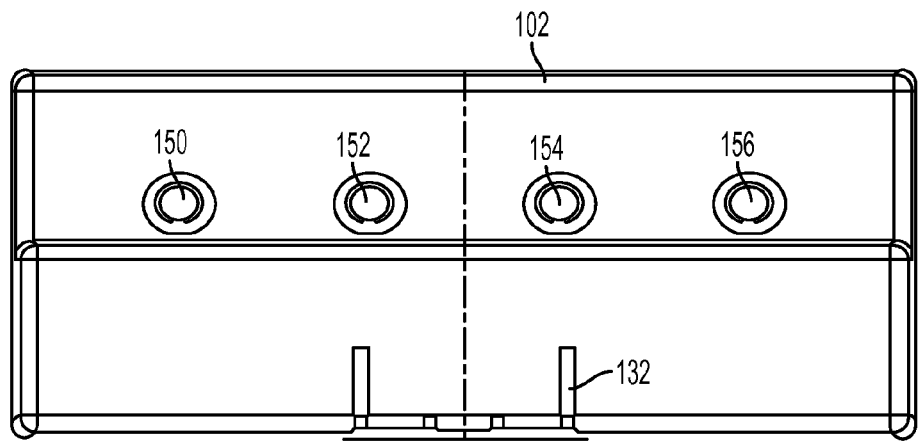

Referring now to the drawings, wherein like reference numerals designate identical or corresponding parts throughout the several views, exemplary embodiments of the present invention are shown in schematic detail.

The matters defined in the description such as a detailed construction and elements are nothing but the ones provided to assist in a comprehensive understanding of the invention. Accordingly, those of ordinary skill in the art will recognize that various changes and modifications of the embodiments described herein can be made without departing from the scope and spirit of the invention. Also, well-known functions or constructions are omitted for clarity and conciseness. Certain exemplary embodiments of the present invention are described below in the context of commercial application. Such exemplary implementations are not intended to limit the scope of the present invention, which is defined in the appended claims.

Referring to FIGS. 1A-1E (where the dimensions are in millimeters; however, these dimensions are non-limiting and provided here for illustrative purposes to further facilitate understanding of exemplary embodiments), according to an exemplary embodiment of the present invention, a lamp ballast monitoring system and method provide an electronic monitoring unit 100 that interfaces with a host lighting fixture or luminaire to allow the status of the host to be remotely monitored. In the example of FIGS. 1A-1E, monitoring unit 100 includes a body 102 having disposed therein sensor elements 106, 108, 110, 112 connected via respective supports 114, 116, 118, 120 to a circuit board 104 having associated circuit components disposed thereon. In an exemplary implementation, sensor elements include transformer coils disposed about hollow, essentially cylindrical, posts 122, 124, 126, 128, which are disposed within volume 134 of body 102 and define respective, essentially cylindrical, open channels 156, 154, 152, 150 extending through the volume 134.

In an exemplary implementation, posts 122, 124, 126, 128 can be formed essentially integral with, and define a portion of, body 102. In a further exemplary implementation, body 102 may also include tabs 130 and 132 having varying configurations for securing monitoring unit 100 with respect to, for example, a device being monitored, as described further with reference to, for example, a host luminaire of FIG. 4B.

In yet further exemplary implementation, body 102 may further include volume 136 for example to accommodate additional circuit components which may be disposed on circuit board 104, which may extend into volume 136. As illustrated in FIGS. 1A-1E, the relative shape and position of volumes 134 and 136 may be such as to define a step 138, whereby channels 150, 152, 154, 156 can be configured to pass only through upper step portion of volume 134 and essentially parallel to base 135. (See FIGS. 1B and 1D).

According to exemplary implementation illustrated in FIGS. 1A-1E, monitoring unit 100 is configure to accommodate up to four sensor elements 106, 108, 110, 112 including associated circuitry disposed on circuit board 104, for example to monitor four individual conditions or states of a host lighting fixture, which may include without limitation:

Mains lamp on status (digital)
Inhibit input status (digital)
Emergency lamp current (analog)
Battery charge current (analog)

Figure 2:
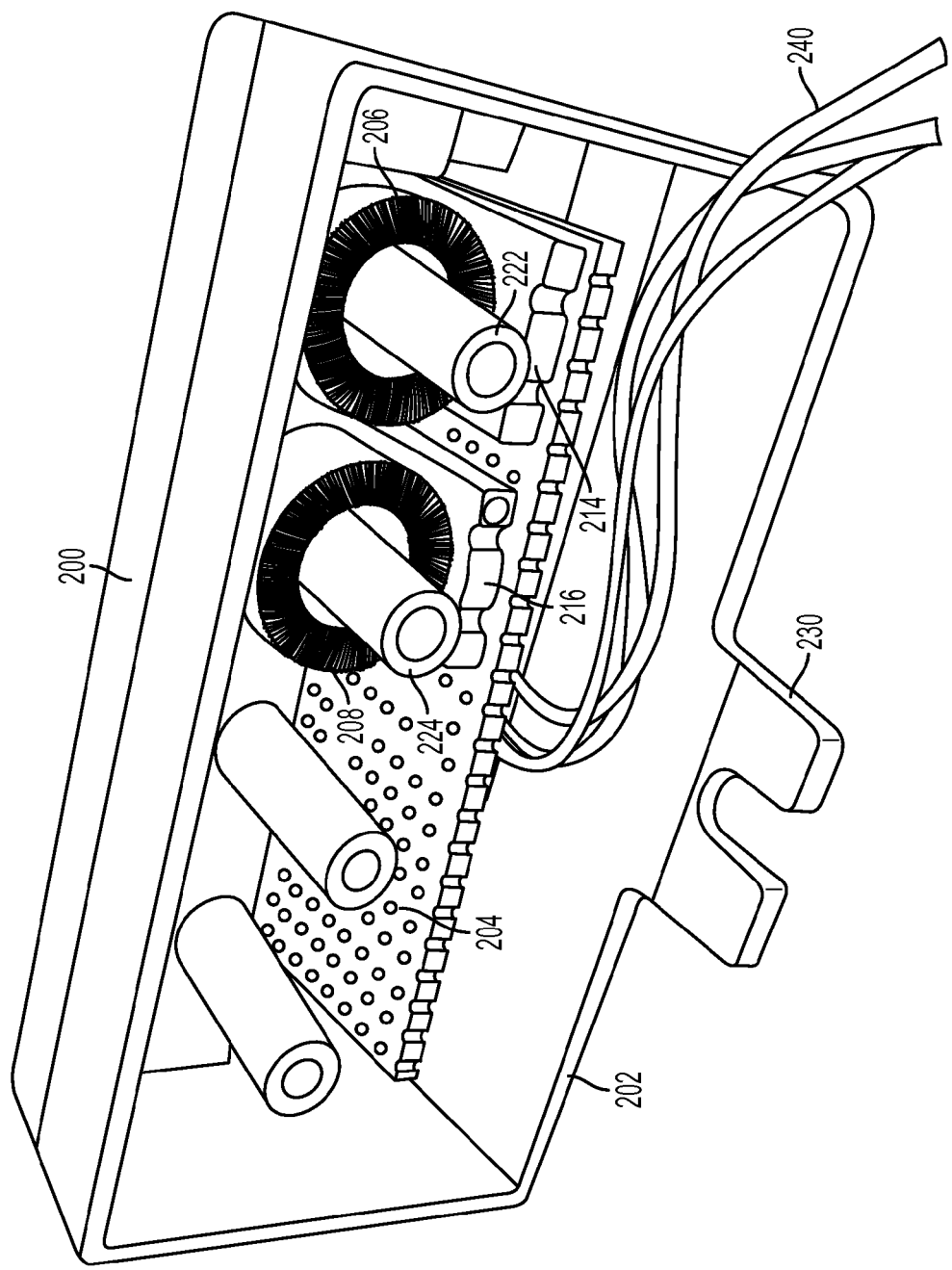
FIG. 2 is three-dimensional drawing illustrating interior of a housing and location of electronic components of a monitoring unit in accordance with exemplary embodiments of the present invention.

The number of sensor elements and associated circuitry disposed within body 102 of monitoring unit 100 can vary depending on desired applications. For example, as illustrated in FIG. 2, according to an exemplary embodiment of the present invention, monitoring unit 200 includes two sensor elements 206, 208 connected via respective supports 214, 216 to a circuit board 204 having associated circuit components disposed thereon. In the exemplary implementation of FIG. 2, sensor elements 206, 208 each include a transformer coil disposed about any one the four posts within body 202, such as posts 222, 224 in the example of FIG. 2. As further illustrated in the example of FIG. 2, body 202 includes an integral tab 230 for securing monitoring unit 200, for example with respect to a device being monitored. Wiring 240 provides input/output (I/O) data interface for monitoring unit 200 and may also be used to supply power to monitoring unit 200.

Figure 1F:
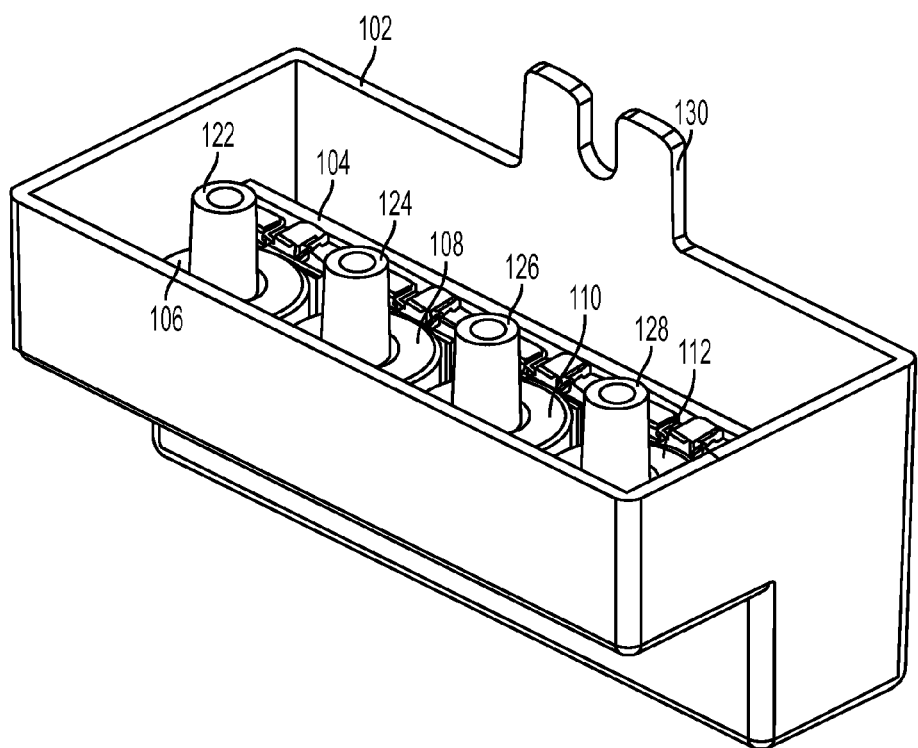
Figure 3A:
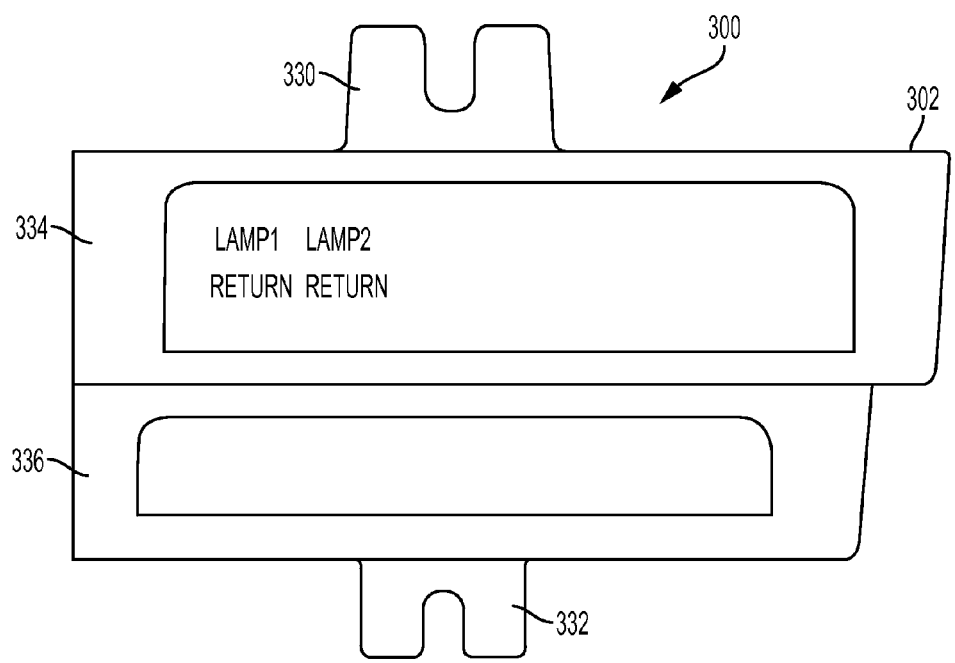
FIGS. 3A and 3B are multiple views of exemplary structure and configuration for a monitoring unit in accordance with exemplary embodiments of the present invention.
Figure 3B:
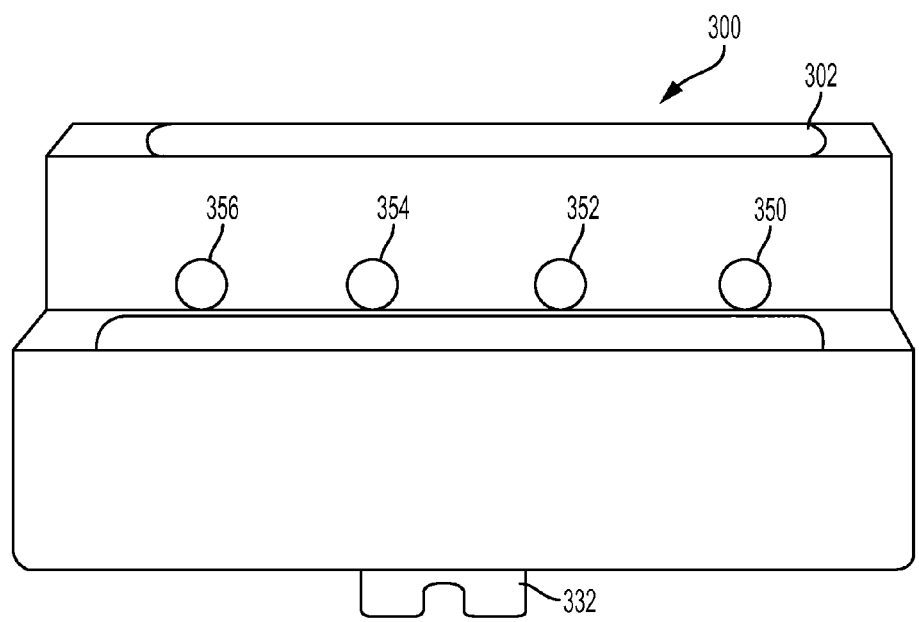

FIGS. 3A and 3B illustrate top and front view, respectively, of monitoring unit 300 according to an exemplary embodiment of the present invention. In this configuration, FIG. 2 is illustrative of an exposed rear view of such an exemplary implementation of a monitoring unit. Referring to FIG. 3A, section of volume 334 of housing 302 of monitoring unit 300 is configured to accommodate sensor elements, such as elements 206, 208 of FIG. 2, and section or volume 336 is configured to accommodate at least part of a circuit board with associated circuit components, such as circuit board 204 of FIG. 2. In the example of FIGS. 3A and 3B, housing 302 includes integral tabs 330 and 332 for securing monitoring unit 300. As further illustrated in FIG. 3B, volumes 334 and 336 are configured such that housing 302 has a step shape (see also, for example, FIGS. 1D and 1F) with open channels 350, 352, 354, 356 extending through section or volume 334 to accommodate appropriate wiring of a device being monitored with respect to sensor elements, such as 206, 208 of FIG. 2. Housing 302 can include permanent or removable labels, such as "Lamp1" "Lamp2" further illustrated in the example of FIG. 3A, to facilitate identification of appropriate wiring of the device being monitored as disposed in open channels 350, 352, 354, 356.

Figure 4A:
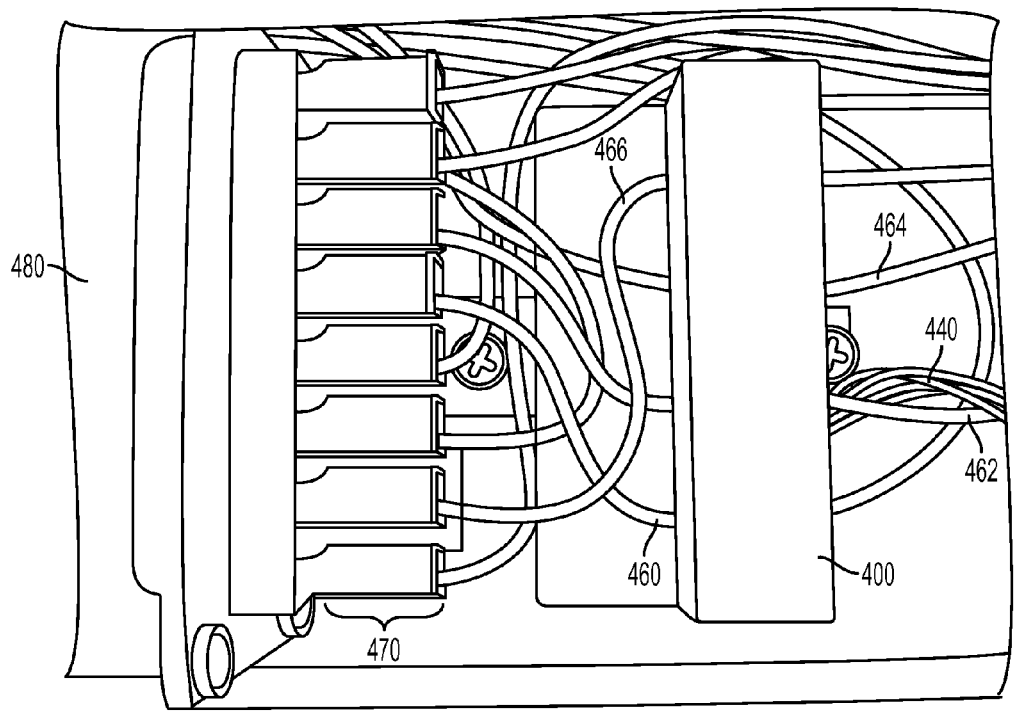
FIGS. 4A and 4B are diagrams illustrating an exemplary configuration of a monitoring unit and ballast in a host fixture according to exemplary embodiments of the present invention.
Figure 4B:
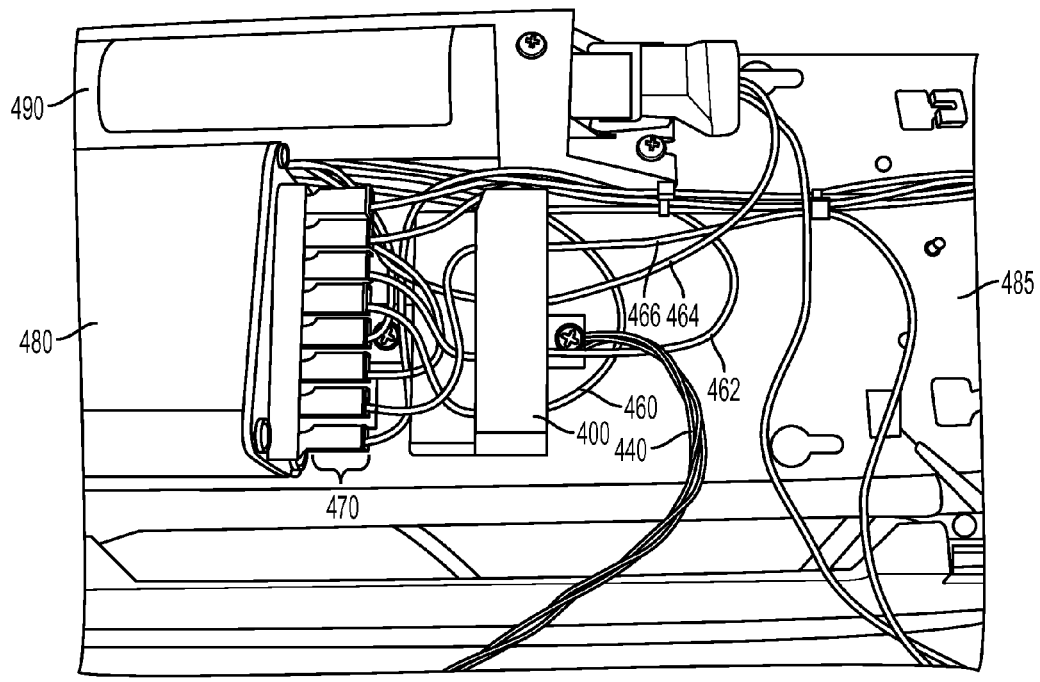

Referring to FIGS. 4A and 4B, according to an exemplary embodiment of the present invention, a monitoring unit 400 can be installed in a light fixture including housing 485, ballast 480 and battery 490. In an exemplary, non-limiting implementation, monitoring unit 400 can be configured to derive the following data:

Battery charge condition
Loss of mains power
Estimated standby battery life

In an exemplary implementation of a monitoring unit, as shown in for example FIGS. 3A, 3B, 4A and 4B, monitoring wire feed through is horizontal through an elevated part 334 of housing 302. This configuration facilitates easier feeding through of wires 460, 462, 464, 466 when, for example, configuring with a ballast 480 as illustrated in FIGS. 4A and 4B. As in the example of FIG. 3A, housing 485 can include permanent or removable labels, such as "Lamp1 return" "Lamp 2 return" "Battery" "Energy Block" to facilitate identification of appropriate wiring of the device being monitored as disposed in open channels of monitoring unit 400.

Figure 5A:
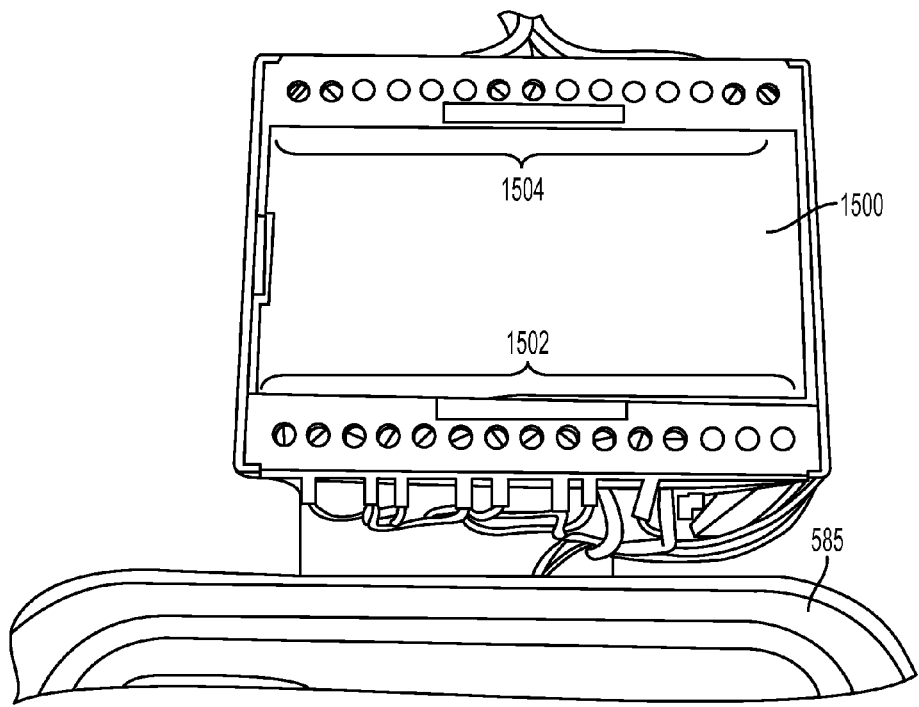
FIG. 5A is a diagram illustrating a data transmitter for use with a monitoring unit in a system according to exemplary embodiments of the present invention.
Figure 5B:
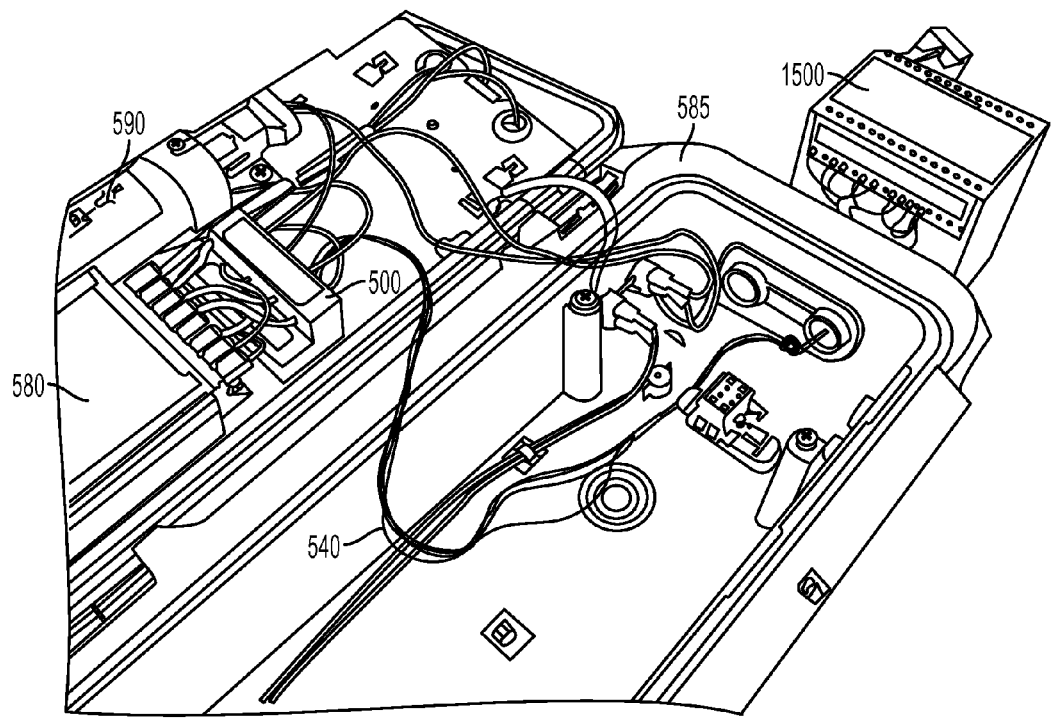
FIG. 5B is a diagram illustrating an example of a host fixture, including monitoring unit and ballast, with a data transmitter configured according to an exemplary embodiment of the present invention.

FIGS. 5A and 5B illustrate an exemplary embodiment of the present inventions showing a luminaire housing 585 including ballast 580 configured with a monitoring unit 500 which has four holes to allow the cabling to pass through prior to being connected to the ballast 580, as similarly illustrated in the examples of FIGS. 4A and 4B. In the examples of FIGS. 4A, 4B, 5A and 5B, the cables being used with the monitoring unit 400, 500 are the return cables 460, 462 for each lamp, one of the battery cables 464 and one of the indicator cables 466. The monitoring unit 500, 400 may interface with mains only and standby emergency lighting fixtures.

As further illustrated in the exemplary implementations of FIGS. 4A, 4B, 5A and 5B, monitoring unit 400, 500 can communicate with central monitoring equipment (not shown) via, for example a two-wire, field bus network. For example, monitoring unit 400, 500 can interface with a field bus network using wiring 440, 540 connected at terminals 1502 of a transmitter 1500 connected to a field bus network at terminals 1504. As noted with reference to FIG. 2, wiring 440,540 provides input/output (I/O) data interface for monitoring unit 400, 500, and may also supply power to monitoring unit 400,500. In an exemplary implementation, transmitter 1500 can be a four channel analogue transmitter (such as SILBUS-TX4A(G) manufactured by Ausdac Pty Ltd.) that can transmit to and receive from a field bus network up to four analogue signals on four independent valid filed bus channels. In an exemplary implementation four analogue inputs of transmitter 1500 can be galvanically isolated from the field bus network port. In another exemplary implementation, transmitter 1500 can be configured using a laptop computer, each analogue input can be independently programmed to any field bus channel address, and each analogue input can also have it's under range, hysteresis, digital fault channels and transmission protocol configured by a user.

Figure 6A:
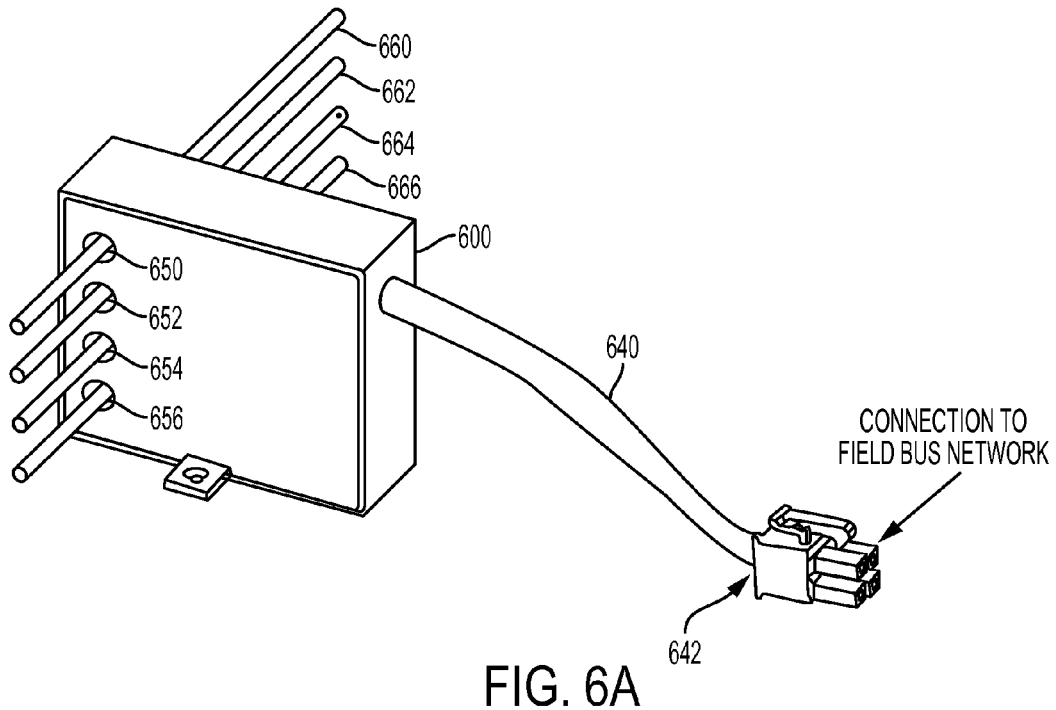
FIG. 6A is a diagram illustrating an exemplary configuration of a monitoring unit connecting to a field bus network according to exemplary embodiments of the present invention.
Figure 6B:
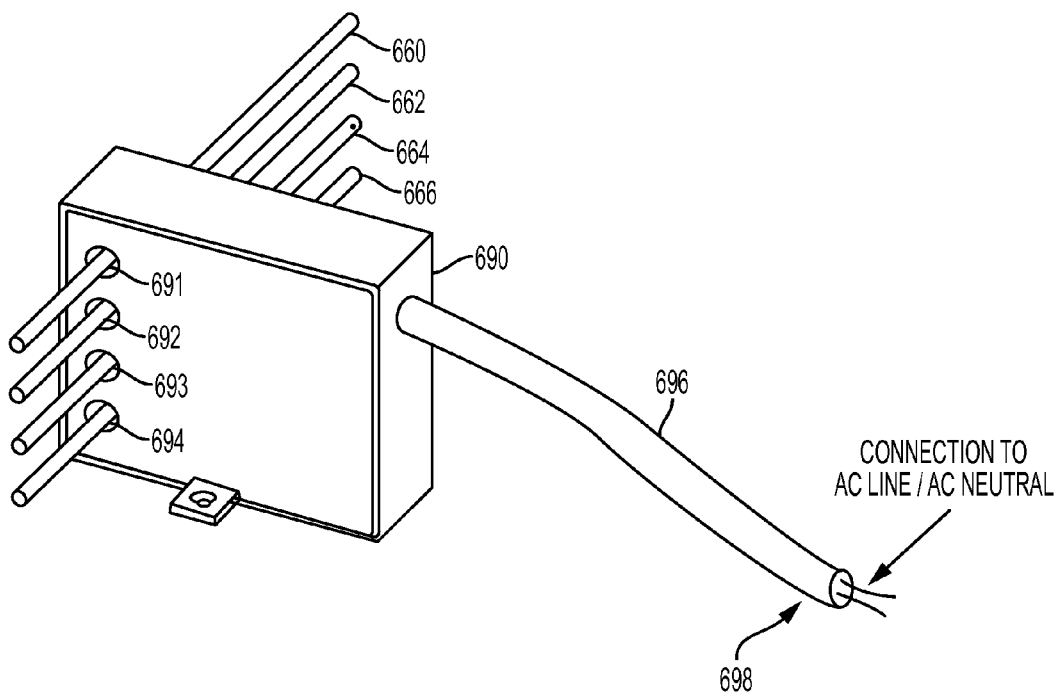
FIG. 6B is a diagram illustrating an exemplary configuration of a monitoring unit connecting to a power line according to exemplary embodiments of the present invention

As illustrated in FIGS. 6A and 6B, according to an exemplary embodiment of the present invention, monitoring unit 600 or 690 interfaces with the host in a fully galvanically isolated manner using insulated holes 650, 652, 654, 656 or 691, 692, 693, 694 through respective current transformers (see, for example, FIG. 2). This type of interface allows the host lighting fixture to be monitored in the least intrusive manner by a monitoring unit 600, 690 seamlessly fitted to new luminaires or with minimal work to existing luminaires (see for example, FIGS. 4A, 4B, 5A and 5B). The current transformer interface has minimal effect on the host ballast functionality and operation. Because of the galvanic isolation between the host and the monitoring unit, the fitment of the monitoring unit should not impact on the certification and approvals of the host luminaire. FIG. 6A illustrates an exemplary implementation of a monitoring unit 600 configured to interface 640 with a field bus network via connection 642. On the other and, FIG. 6B illustrates an exemplary implementation of a monitoring unit 690 configured to interface 696 with a PLC master (described in more detail below) via connection 698 to AC line/AC Neutral.

Figure 7:
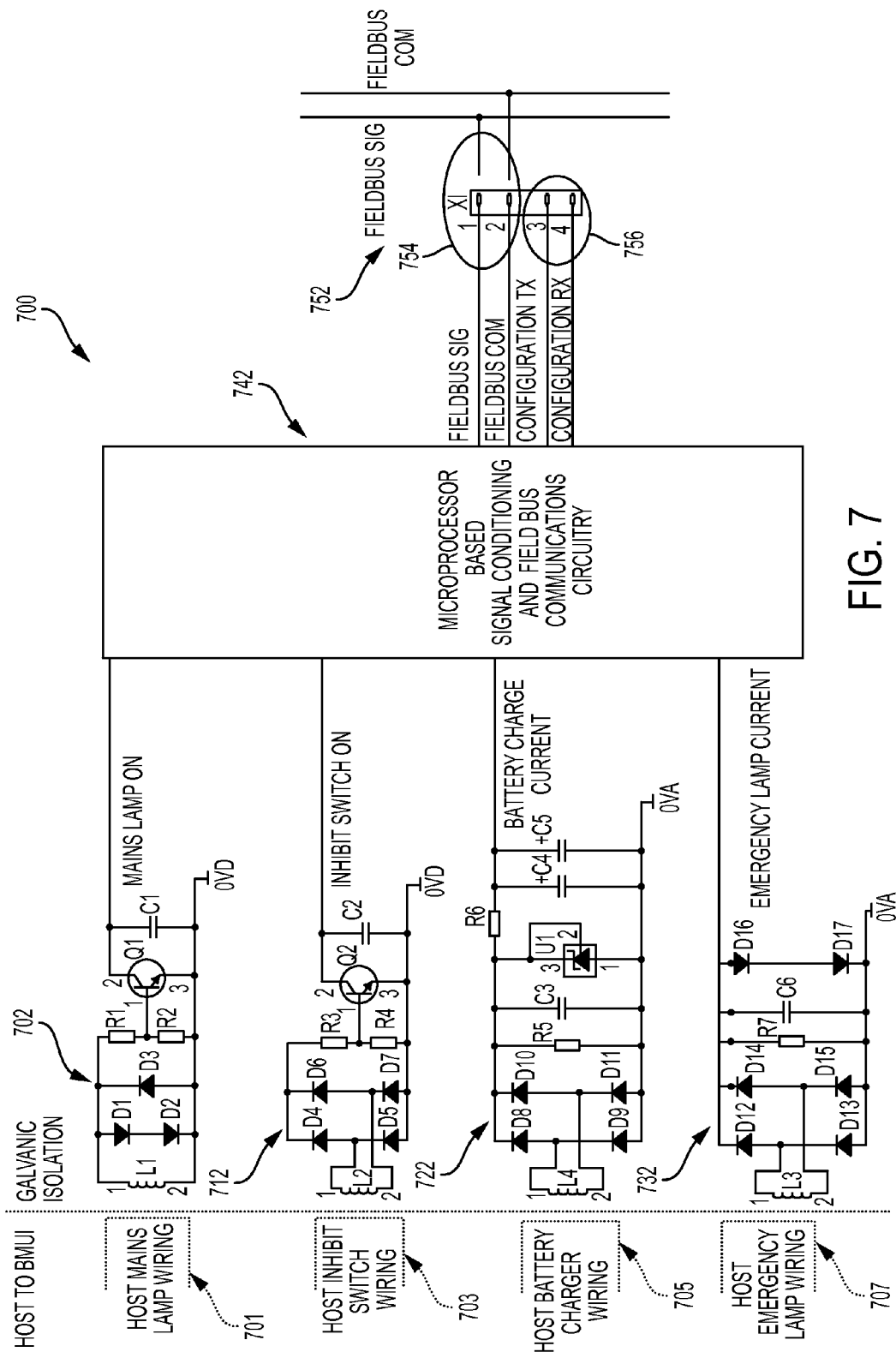
FIG. 7 is a circuit and block diagram illustrating an exemplary implementation of a monitoring unit for system and methods according to exemplary embodiments of the present invention.

FIG. 7 illustrates examples of sensor circuits 702, 712, 722, 732 of a monitoring unit 700 for monitoring an emergency lighting luminaire, and conceptually illustrates how these sensor circuits 702, 712, 722, 732 connect to a microprocessor based signal conditioning and field bus communications circuitry 742 for communicating sensed information to a master controller via field bus communication interface 752. Example of FIG. 7 further illustrates an implementation where, in addition to field bus signal and communication connection interface 754 for a two-wire field bus, connection for microprocessor 742 includes a configuration transmit/receive interface 756.

According to a non-limiting exemplary implementation, a sensor 702 (for detecting from a host mains lamp wiring 701 information indicative of mains lamp on condition) includes a current transformer comprising inductor L1 sensing information from host mains lamp wiring 701 in galvanic isolation from host. Associated circuitry includes circuit components configured as shown (where, for example, R1=1 kOhm, R2=3.3 kOhm, and C1=1 µF).

According to a non-limiting exemplary implementation, a sensor 712 (for detecting from a host inhibit switch wiring 703 information indicative of inhibit switch on condition) includes a current transformer comprising inductor L2 sensing information from host inhibit switch wiring 703 in galvanic isolation from host. Associated circuitry includes circuit components configured as shown (where, for example, R3=1 kOhm, R4=1 MOhm, and C2=10 µF).

According to a non-limiting exemplary implementation, a sensor 722 (for detecting from a host battery charger wiring 705 information indicative of battery charge current) includes a current transformer comprising inductor L4 sensing information from host battery charger wiring 705 in galvanic isolation from host. Associated circuitry includes circuit components configured as shown (where, for example, R5=1 kOhm, R6=270 kOhm, C3=1 µF, C4=20 µF (2 of 10 µF in parallel), U1=TS431AIL (1.25 V bandgap reference, Sot 23-5, SMT)).

According to a non-limiting exemplary implementation, a sensor 732 (for detecting from a host emergency lamp wiring 707 information indicative of emergency lamp current) includes a current transformer comprising inductor L3 sensing information from host emergency lamp wiring 707 in galvanic isolation from host. Associated circuitry includes circuit components configured as shown (where, for example, C6=10 μF and R7=220 Ohm for (2 mV out)/(mA RMS lamp current) or 440 Ohm for (4 mV out)/(mA RMS lamp current) or 550 Ohm for (5 mV out)/(mA RMS lamp current)).

An exemplary implementation of a monitoring module utilizes current transformers having the following characteristic performance: for 50 Hz current drive 5.6 A RMS, relative current of 2 A/div and relative output voltage 1 Volt/div.

Figure 11:
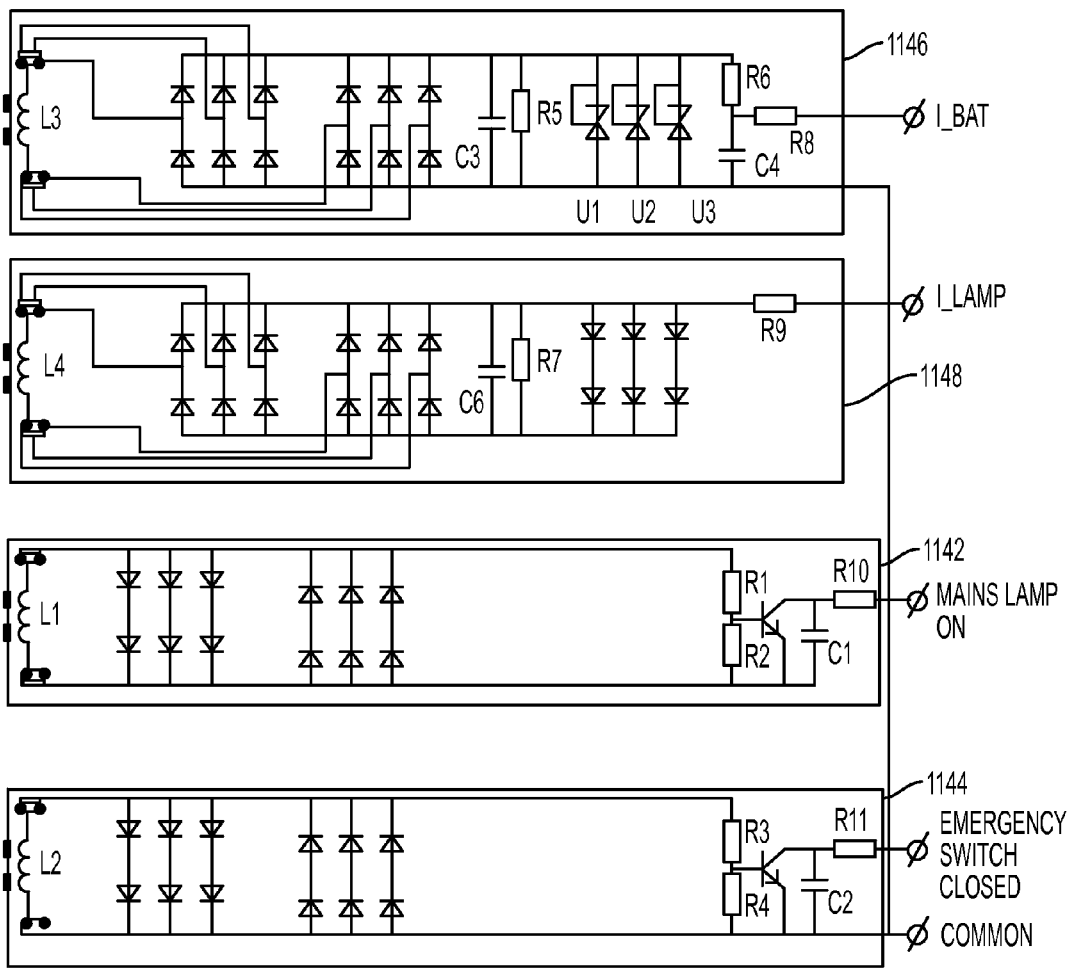
FIG. 11 is a circuit diagram for illustrating configuration of a monitoring unit according to other exemplary embodiments of the present invention.
Figure 12:
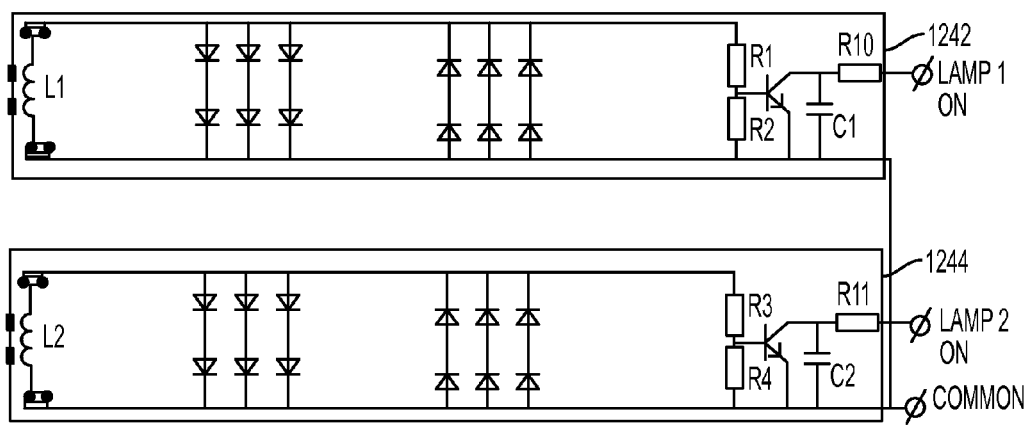
FIG. 12 is a circuit diagram for illustrating configuration of a monitoring unit according to yet other exemplary embodiments of the present invention.

FIGS. 11 and 12 illustrate other exemplary implementations of sensor circuits 1142, 1144, 1146, 1148 for respective current transformers L1, L2, L3, L4 where redundancy (for example, triplication) can be used in rectification of the current transformer output (compare circuits 702, 712, 722 and 732 of FIG. 7, with respective circuits 1142, 1144, 1146, 1148). An example of a two-sensor configuration is illustrated in FIG. 12 where sensor circuits 1242 and 1244 are used to detect conditions of lamp 1 and lamp 2 respectively. Such sensor circuits 1242 and 1244, and respective current transformers, can be configured as illustrated in the example of FIG. 2.

According to an exemplary implementation, monitoring operation is independent of the wire feedthrough polarity. For symmetrical signals like lamp current the detector may be asymmetric. For asymmetric signals (battery current and emergency block signal) a front-end bridge rectifier makes the detection independent of polarity of the coupling.

Figure 8:
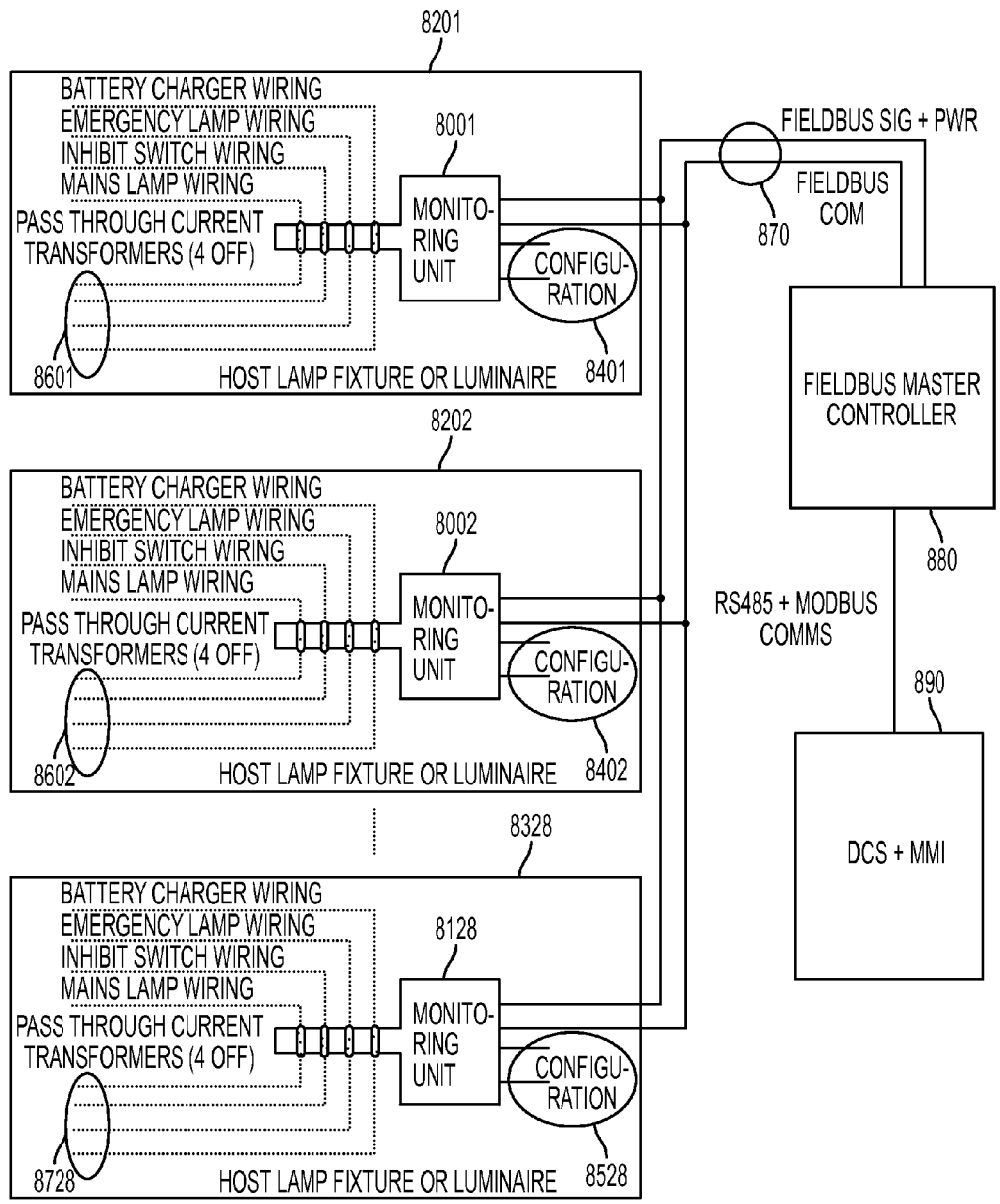
FIG. 8 is a block diagram illustrating an exemplary implementation of system and methods comprising a plurality of monitoring units and fixtures associated with a master controller according to exemplary embodiments of the present invention.

Referring to FIG. 8, in an exemplary implementation, up to 128 monitoring units 8001, 8002, . . . 8128, may be deployed in respective host lamp fixtures or luminaires 8201, 8202, . . . 8328 (for detecting information from respective host wiring 8601, 8602, . . . 8728), and multi-dropped on a single field bus network 870 including a field bus master controller 880 and associated Distributed Control System with remote or integrated man-machine-interface (DCS+MMI) 890. Each unit 8001, 8002, . . . 8128, can have structure and configuration of unit 300 as shown in FIG. 3, and components of unit 700 as shown in FIG. 7. Power for monitoring units 8001, 8002, . . . 8128, can be derived from the field bus network. Based on a DCS+MMI configuration 890, according to exemplary embodiments of the present invention, operating parameters and addressing information for each monitoring unit 8001, 8002, . . . 8128 can be configured via a serial interface 8401, 8402, . . . 8528 using a laptop or PC. While not shown, interface with a monitoring unit can be a wireless interface, such as near field RF communication, where a monitoring unit is configured with a wireless transceiver instead of, or in addition to, a wired interface.

Figure 9:
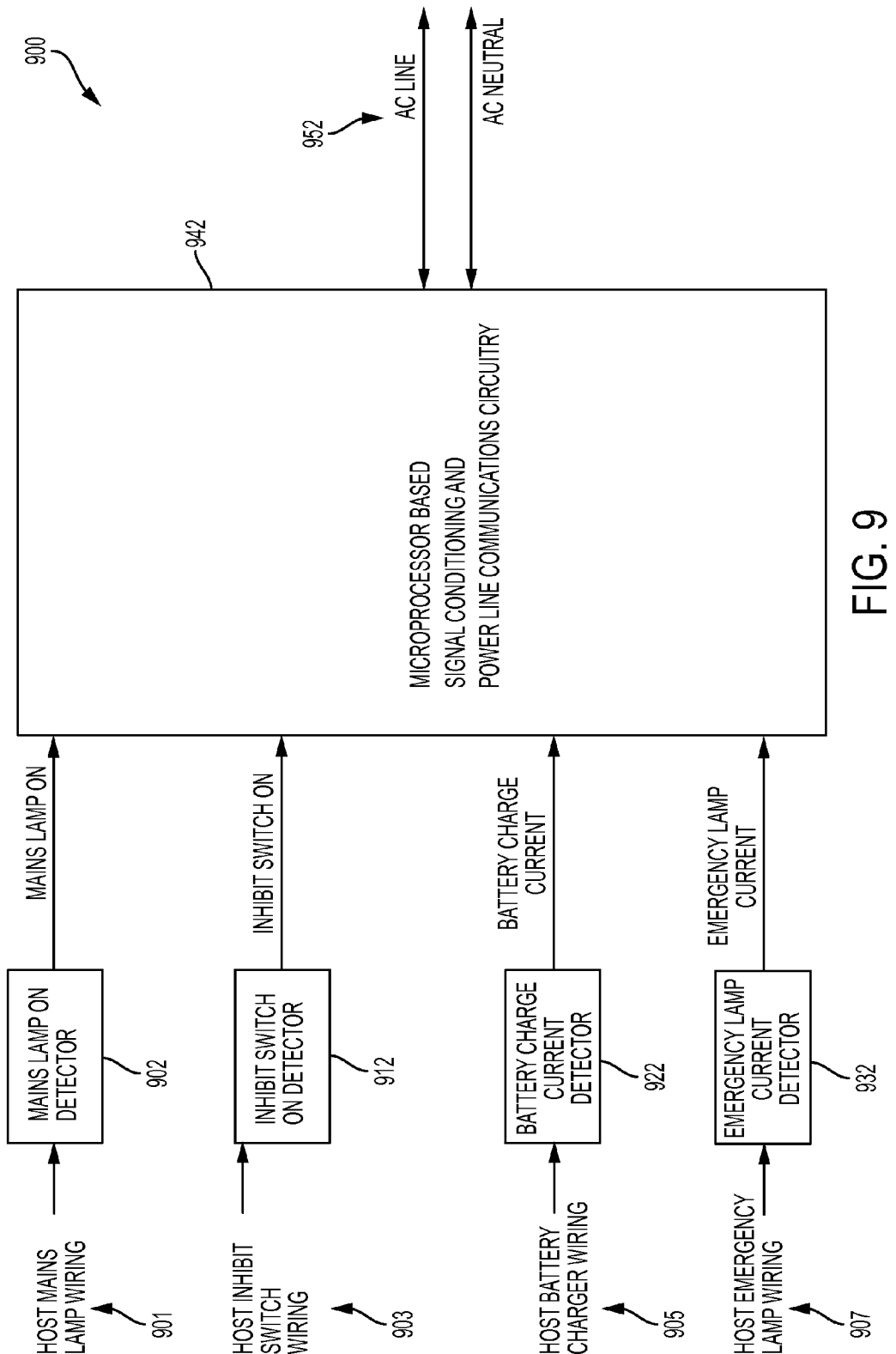
FIG. 9 is a circuit and block diagram illustrating another exemplary implementation of a monitoring unit for system and methods according to exemplary embodiments of the present invention utilizing Power Line Communication (PLC).
Figure 10:
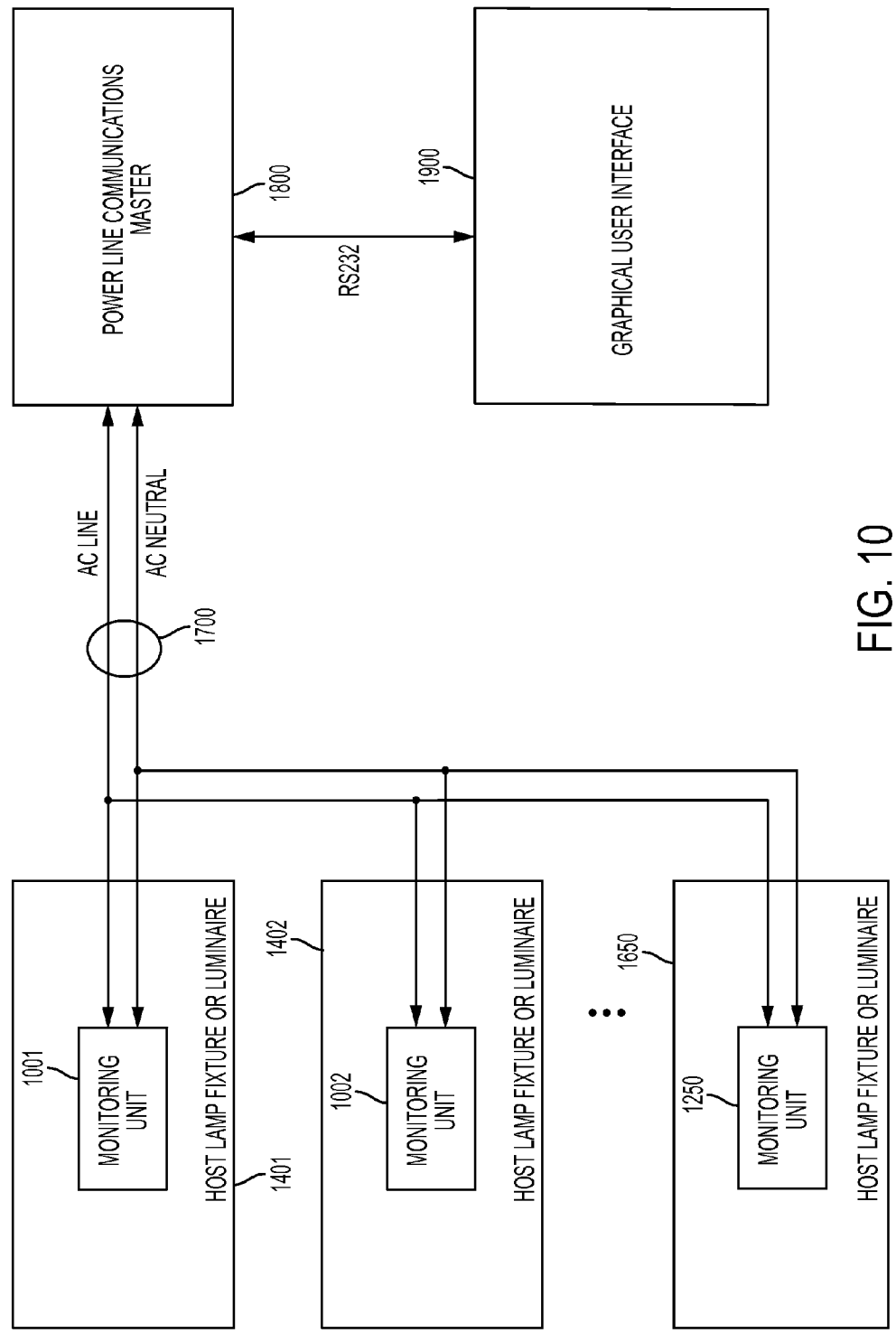
FIG. 10 is a block diagram illustrating an exemplary implementation of system and methods comprising a plurality of monitoring units and fixtures associated with a PLC master according to exemplary embodiments of the present invention.

Referring to FIGS. 9 and 10, a monitoring unit 900 according to another exemplary embodiment of the present invention can include four detection circuits (analogous to those illustrated in FIG. 7): mains lamp on detector 902, inhibit switch on detector 912, battery charge current detector 922, and emergency lamp current detector 932. In the example of FIG. 9, the detection circuits allow the sensor to monitor four AC currents associated with lamp ballast. The detection circuits 902, 912, 922, 932 convert an AC current into a DC voltage utilizing a set of current transformers. These four DC voltages are subsequently fed into a four-channel analog-to-digital converter (ADC) (such as, for example a Microchip MCP3204 2.7V 4-Channel 12-Bit A/D Converter with SPI Interface). In the exemplary embodiments illustrated in FIGS. 9 and 10, monitoring unit 900 includes a PLC circuit, which utilizes for example an OFDM-Based power line communication modem (such as MAX2990 manufactured by Maxim Integrated Products) and a power line communications integrated analog front-end transceiver (such as MAX2991 manufactured by Maxim Integrated Products), which may be included in microprocessor based signal conditioning and power line communication circuitry 942 to facilitate power line communication 952, instead of field bus communication (compare FIG. 7 with FIG. 9).

According to yet another exemplary implementation as illustrated in FIG. 10, a lamp ballast monitoring system may contain several (up to 250) monitoring units 1001, 1002, . . . 1250, each disposed in respective host lamp fixture or luminaire 1401, 1402, . . . 1650 analogous to configuration shown in examples of FIG. 4A and 4B. Each monitoring unit 1001, 1002, . . . 1250, can have components analogous to monitoring unit 900 illustrated in the example of FIG. 9. Each monitoring unit 1001, 1002, . . . 1250, can continuously monitor its four detection circuits and relay this information upon request to the PLC Master 1800 via the AC power line 1700. The PLC Master 1800 includes a power line communications circuit which can also utilize integrated circuits analogous to those included in circuitry 942 shown in the example of FIG. 9. The PLC Master 1800 also contains an interface, for example an RS-232 serial interface, to provide connectivity with, for example PC-based, Graphical User Interface (GUI) 1900, which provides a user interface to the system. According to an exemplary implementation of the present invention, PLC Master 1800 can continuously poll each of the monitoring units 1001, 1002, . . . 1250, retrieve the current status of the associated detection circuits, and relay this information to the GUI 1900 for further processing.

Figure 13A:
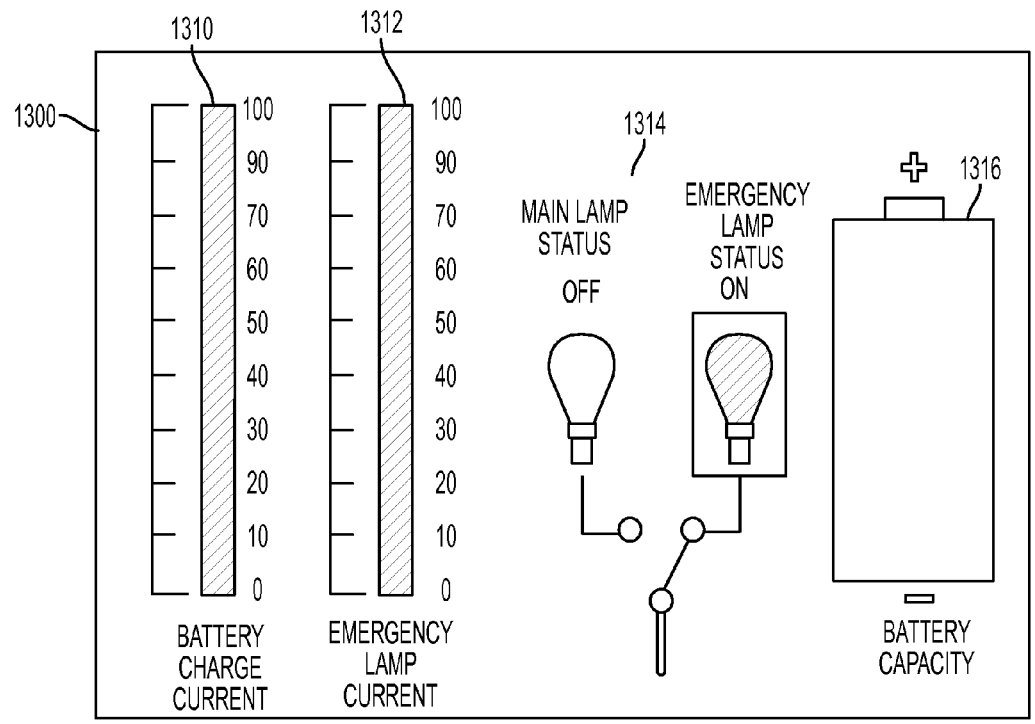
FIGS. 13A and 13B are examples of displays in a graphical user interface (GUI) for systems and methods according to exemplary embodiments of the present invention.
Figure 13B:
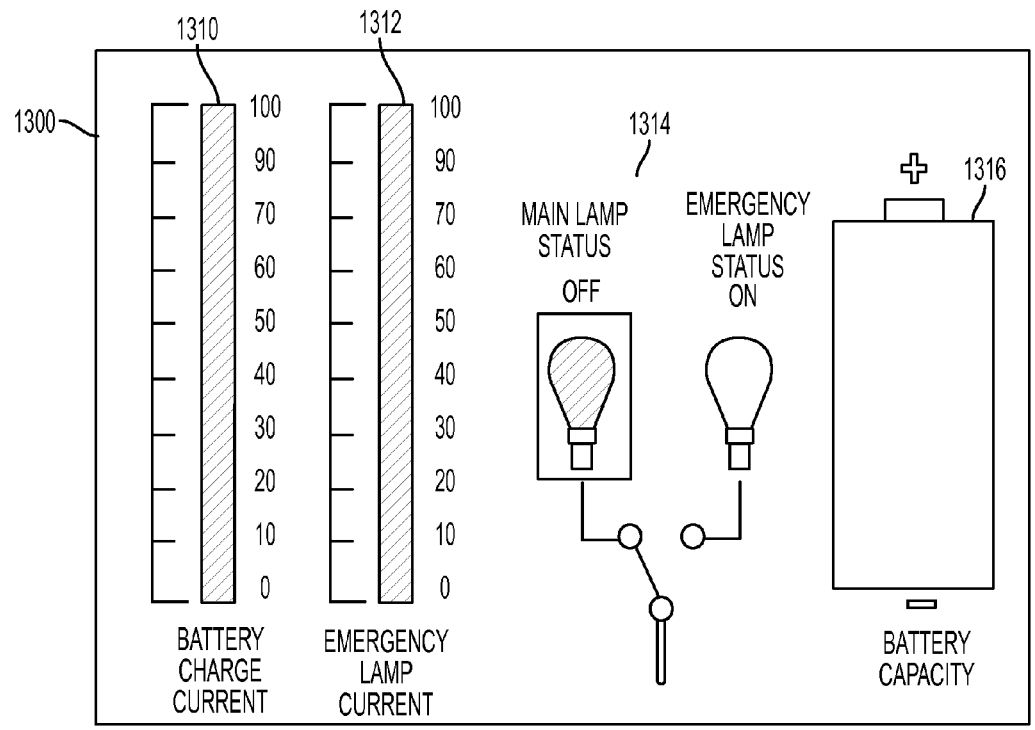

As illustrate in FIGS. 13A and 13B, according to exemplary implementations of the present invention, GUI can include a display output graphically illustrating information received from a monitoring unit. Examples of displayed information and selected format include: battery charge current 1310 and emergency lamp current 1312 both displayed in a bar graph format; main lamp and emergency lamp status indicator 1314 displayed in an animation cartoon-like format (compare FIGS. 13A and 13B); and battery charge current indicator 1316 displayed in a symbolic graph-like format.

According to an exemplary embodiment of the present invention, communication between the PLC Master and the monitoring units can be half-duplex and always initiated by the PLC Master. For example, referring to FIG. 10, the process can begin when the PLC Master 1800 transmits a poll message destined for a monitoring unit at address x (for illustrative purposes, let's assume that monitoring unit 1001 is at address x). The PLC Master 1800 can then start a response timeout timer. Upon detection of the poll message, the monitoring unit 1001 at address x will transmit a response message containing for example four 16-bit values, each value representing the current status of one of the four associated detection circuits of the monitoring unit 1001 at address x. The PLC Master 1800 will then relay this information to the GUI 1900 for further processing. If the PLC Master 1800 does not detect a response message before the response timer expires, then the PLC Master 1800 can, for example, re-transmit the poll message and reset the response timeout timer. The PLC Master 1800 can be configured or programmed to repeat this process up to an arbitrary number of times to give the monitoring unit at address x an opportunity to respond. If the monitoring unit does not respond, then a fault condition indicative of a monitoring unit not responding can be reported to the GUI 1900 by the PLC Master 1800. The PLC Master 1800 can subsequently transmit a poll message destined for the next monitoring unit's address (for example, monitoring unit 1002 at address y) in the polling sequence and the entire process can repeat as needed or selected.

According to an exemplary embodiment of the present invention, since DC voltage from detection circuits (such as circuits 702, 712, 722, 732) of a monitoring unit may contain some 50/60 Hz ripple, a method of averaging is performed upon these signals. In an exemplary implementation, each of these four signals can be acquired at a sampling rate of 400 samples/second (a sampling period of 2.5 milliseconds). Such sampling rate allows eight samples to be acquired over a single 50 Hz cycle. A total of 16 consecutive samples are acquired (such that each signal is monitored over a 40 millisecond time interval). These 16 sample values are subsequently summed to yield (average value)*16. These four summed values can then be conveyed to a PLC Master upon request.

Figure 14A:
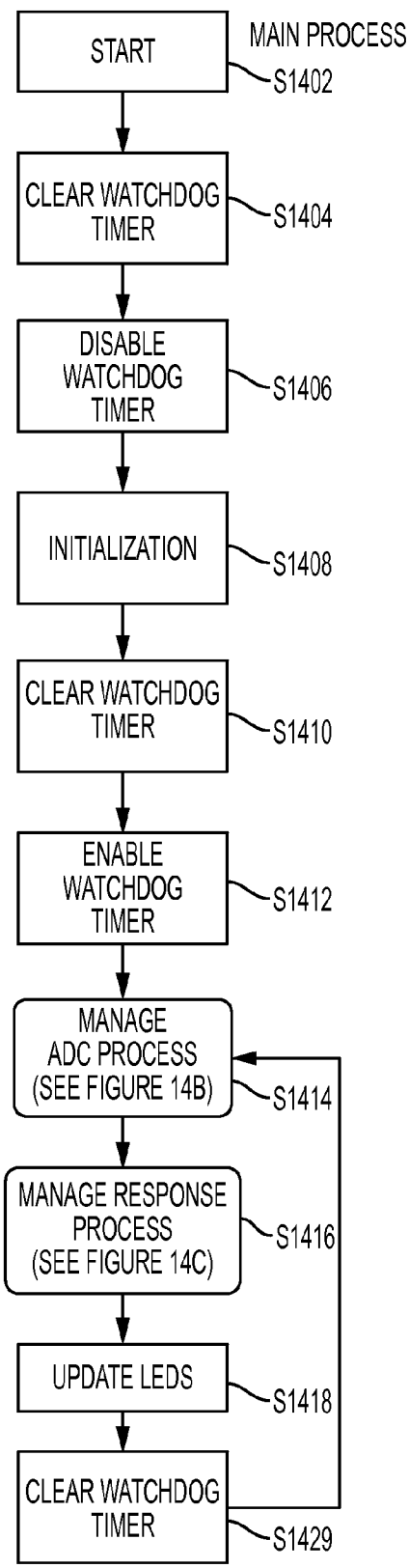
FIGS. 14A, 14B and 14C are flowcharts illustrating an exemplary implementation of processing for acquiring and communicating information using a monitoring unit according to exemplary embodiments of the present invention.
Figure 14B:
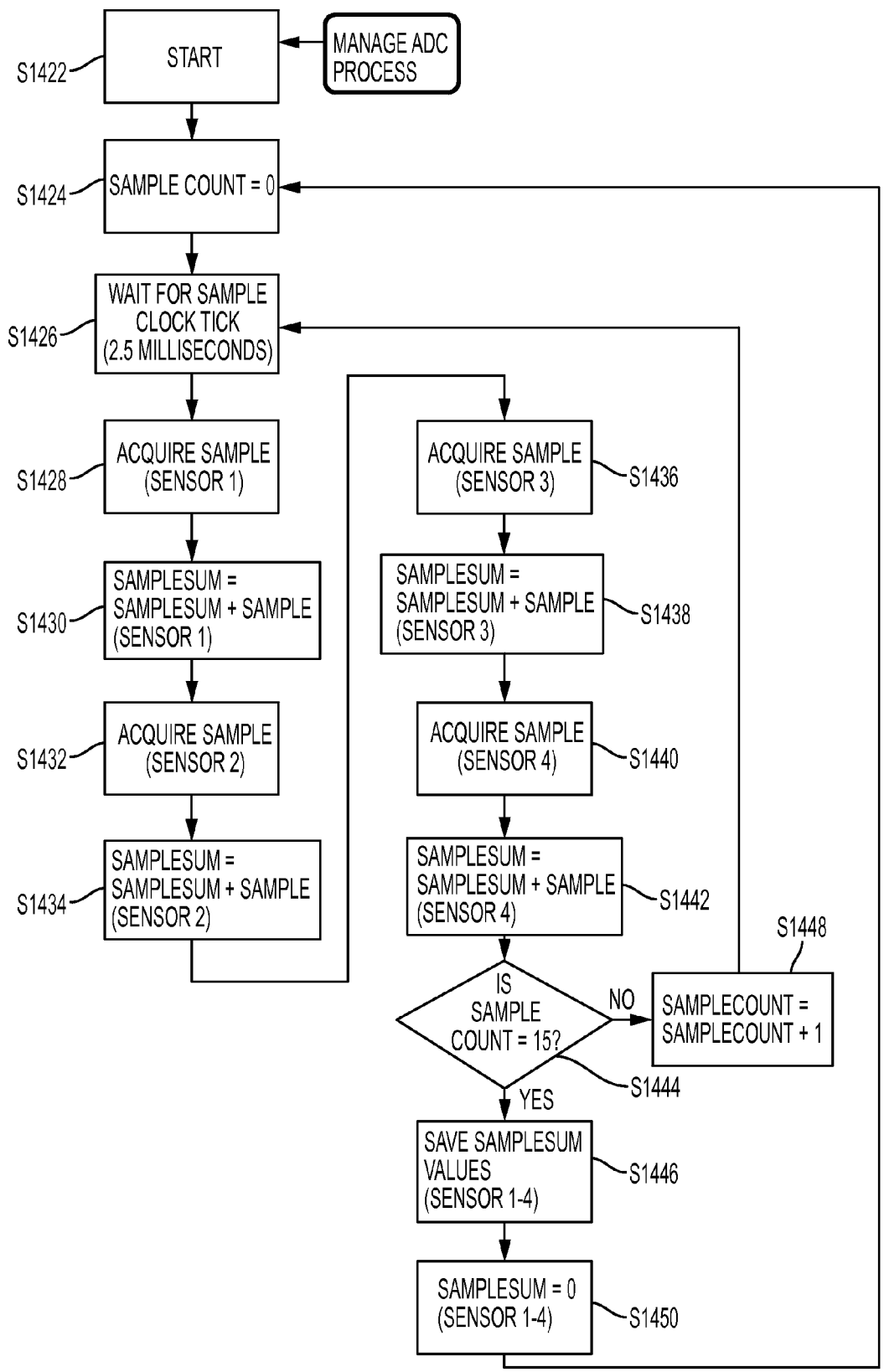
Figure 14C:
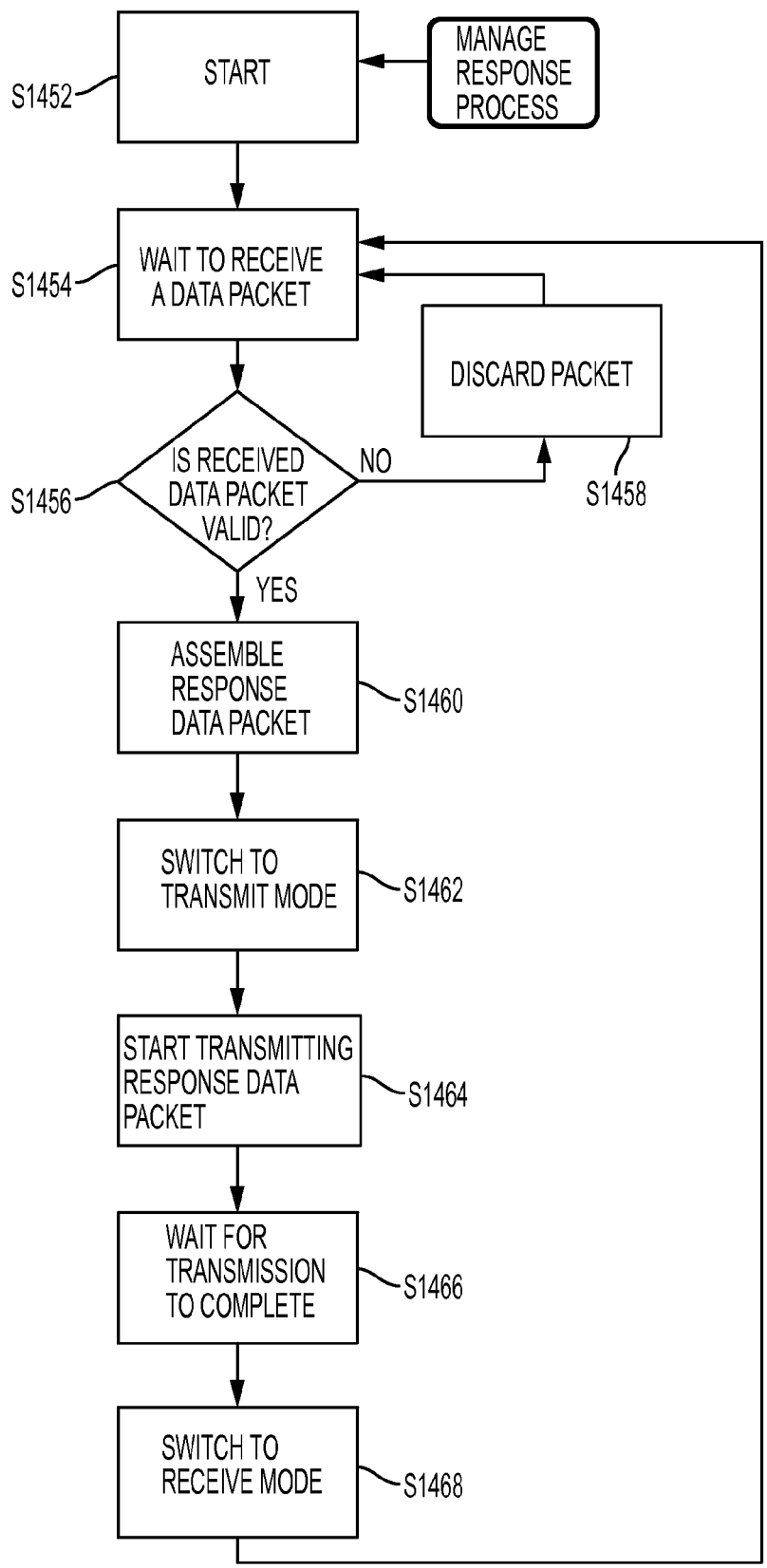

FIGS. 14A, 14B and 14C are process flow diagrams illustrating an exemplary implementation of acquiring data, processing data using an averaging method to obtain information indicative of status of the monitored host, and communicating status information. Referring to FIG. 14A, a main process starts S1402 by clearing S1404 and disabling 1406 a timer, followed by initialization S1408, clearing S1410 and enabling S1412 the timer, then managing ADC process S1414 (for processing information detected by a monitoring unit) and response process S1416 (for example, for responding to a poll message from a PLC Master), updating LEDS S1418, clearing the timer S1420, and looping back to the managing processes.

Referring to FIG. 14B, according to an exemplary implementation, ADC process management stars S1422 by setting S1424 sample counter to zero and waiting S1426 for sample clock to tick (which occurs every 2.5 milliseconds). After the sample clock ticks, sample (SENSOR1) from sensor 1 (such as detector 702) is acquired S1428 and SAMPLESUM is increased accordingly S1430. Then, sample acquisition S1432 and SAMPLESUM increase S1434 are performed for sensor 2 (such as detector 712), followed by sample acquisition S1436 and SAMPLESUM increase S1438 for sensor 3 (such as detector 722), and sample acquisition S1440 and SAMPLESUM increase S1442 for sensor 4 (such as detector 732). After acquiring a sample for each of the four sensors, counter SAMPLECOUNT is increase S1448 by 1, and sample acquisition with SAMPLESUM increase is repeated until SAMPLECOUNT=15 as a condition S1444 to acquire a total of 16 consecutive samples. The acquired SAMPLESUM values for sensors 1-4 are saved S1446, SAMPLESUM is set to zero for sensor 1-4, and processing is ready to resume again with SAMPLECOUNT set to zero S1424.

Referring to FIG. 14C, according to an exemplary implementation, response process management stars S1452 by waiting to receive a data packet S1454 (such as a poll message from a PLC Master), and determining S1456 if the received data packet is valid. If, according to a predetermined or selected criteria, the data packet is not valid then the packet is discarded. If the data packet is valid, a response data packet is assembled S1460, followed by switching to transmit mode S1462, starting S1464 and completing transmitting of a response data packet(s), and switching back to receive mode S1468 to wait to receive another data packet S1454.

Figure 15:
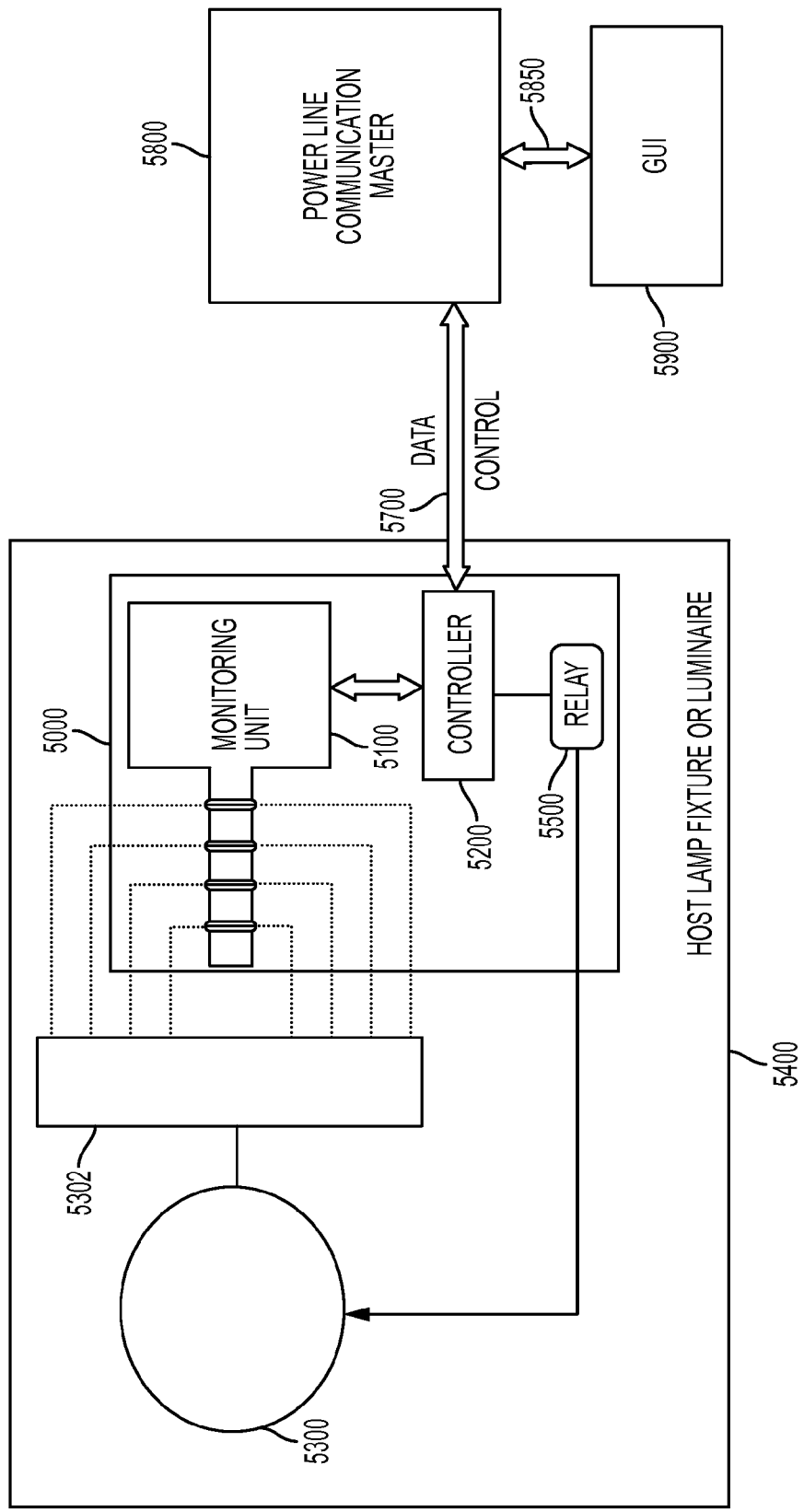
FIG. 15 is a block diagram of a system including a monitoring and control until according to another exemplary embodiment of the present invention.

Referring to FIG. 15, another exemplary embodiment of the present invention provides a monitoring and control unit 5000 which includes a monitoring unit 5100 in communication with a controller 5200, and a control circuit 5500, such as a relay, for controlling operation of a light source 5300 of a host lamp fixture or luminaire 5400. In an exemplary implementation, where the host lamp fixture or luminaire 5400 has features analogous to a luminaire illustrated in FIG. 5B (including a ballast and a battery, shown as a single block 5302), monitoring unit 5100 can include features and configuration analogous to a monitoring unit, as illustrated for example in FIGS. 5B and 9, including detection circuits for monitoring host mains lamp wiring, host inhibit switch wiring, host battery charge wiring, and host emergency lamp wiring. Monitoring unit 5100 can continuously monitor its four detection circuits and transmit this information upon request to a PLC Master 5800 via the AC power line 5700. As in the example of FIG. 10, the PLC Master 5800 includes a power line communications circuit which can also utilize integrated circuits analogous to those included in circuitry 942 shown in the example of FIG. 9. The PLC Master 5800 also contains an interface 5850, for example an RS-232 serial interface or a wireless interface, to provide connectivity with a GUI 5900, which provides a user interface to the system. While not shown, interface with GUI can be a wireless interface when a PLC master and GUI are configured with a wireless transceivers instead of, or in addition to, a wired interface.

According to an exemplary implementation, monitoring and control unit 5000 includes a microprocessor and a non-transient computer readable storage medium, such that the microprocessor can be programmed or configured to control the operation of light source 5300 based on control commands received from PLC Master 5800. According to another exemplary implementation, controller 5200 of the monitoring and control unit 5000 can be programmed or configured to process information received from the monitoring unit 5100 and control operation of light source 5300 based on such processing, for example autonomously. While not shown, the monitoring and control unit 5000 can programmed or configured by wired communication, or wireless communication the when monitoring and control unit 5000 is provided with a wireless transceivers instead of, or in addition to, a wired interface. According to yet another exemplary implementation, monitoring and control unit 5200 can be programmed or configure to receive, by wire or wirelessly, other data or control input (not shown), such as time out constraints, occupancy or ambient light sensor data, or ON/OFF switch commands, and control operation of light source 5300 based on processing of such input or inputs.

As illustrated in the example of FIGS. 8 and 10, according to another exemplary implementation of the present invention, multiple monitoring and control units 5000 of FIG. 15 can be deployed such that PLC Master 5800 can continuously or selectively poll each of the monitoring and control units to retrieve the current status of the associated host lamp fixture or luminaire, and relay this information to the GUI 5900 for further processing. In addition, PLC Master 5800 can selectively control host lamp fixtures or luminaires associated with respective monitoring and control units, for example based on control input via GUI 5900.

The above-described exemplary embodiments may include computer executable instructions to facilitate data storage, communication and control operations, recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the present invention has been shown and described with reference to certain exemplary embodiments thereof, it will be understood by those skilled in the art that various changes in form and details may be made therein without departing from the spirit and scope of the present invention as defined by the appended representative claims.

We claim:

1. A lighting fixture monitoring unit comprising:
   a housing;
   a sensor configured within said housing in a galvanically isolated communication with at least a portion of a wiring of a lighting fixture, said portion of the wiring disposed outside of the housing; and
   a microprocessor receiving output information from the sensor and outputting monitoring data indicative of a status of the lighting fixture,
   wherein said output information received from the sensor is based at least on said galvanically isolated communication with said portion of said wiring disposed outside of the housing.

2. The lighting fixture monitoring unit of claims 1, wherein
   the lighting fixture comprises a ballast and a light source,
   the wiring comprises ballast wiring, and
   the status comprises at least one of mains light source on status, inhibit input status, emergency light source current, and a battery charge current.

3. The lighting fixture monitoring unit of claims 1, wherein the microprocessor outputs the monitoring data to a central monitor via one of a field bus network or a power line communication.

4. The lighting fixture monitoring unit of claims 1, wherein the microprocessor outputs the monitoring data to a central monitor via a wireless communication.

5. The lighting fixture monitoring unit of claims 4, wherein the microprocessor outputs the monitoring data to the central monitor via at least one of a wireless mesh network, a web-based communication, a blue tooth, and a short-range or long-range radio frequency (RF) communication.

6. The lighting fixture monitoring unit of claim 3, wherein the microprocessor derives power from one of the field bus network or the power line.

7. The lighting fixture monitoring unit of claim 1, further comprising an interface, wherein operating parameters and addressing information enabling communication with the microprocessor are configured via the interface.

8. The lighting fixture monitoring unit of claim 1, wherein the housing comprises:
   an interior compartment having the microprocessor and sensor disposed therein, and
   an essentially cylindrical hollow tube projecting through the compartment, the tube having
      a first surface within the interior of the compartment, and
      a second surface exterior to the housing diametrically opposed to the first surface, and defining a portion of an external surface of the compartment,
   the sensor including a current transformer having an essentially toroidal inductor disposed concentrically with respect to the first surface of the tube,
   wherein the wiring of the lighting fixture passes through the tube within the second surface exterior to the housing.

9. The lighting fixture monitoring unit of claim 2, wherein the wiring comprises return cables for at least one of the light source, a battery cable and an indicator cable of the ballast.

10. The lighting fixture monitoring unit of claim 8, wherein the housing further includes an elevated portion and the tube is disposed horizontally through the elevated portion of the housing, whereby the wiring of the fixture is fed through and exterior to the housing via the tube.

11. The lighting fixture monitoring unit of claim 1, wherein the output information from the sensor comprises a sensed AC current signal of the wiring in communication with the sensor,
   the sensed AC current is converted into a DC voltage for analogue to digital signal conversion and averaging process by the microprocessor, and
   the monitoring data indicative of the status output by the microprocessor is derived from the averaging.

12. The lighting fixture monitoring unit of claim 11, wherein the averaging process comprises acquiring samples of the signal at a sampling rate, summing the samples, and yielding the average value from the summing, and
   the status output by the microprocessor is based on the average value.

13. A lighting system comprising:
   a light source;
   a ballast connected to AC mains and providing power to the light source;
   a wiring electrically interconnecting the light source, the ballast and the AC mains;
   a field bus; and
   a monitoring unit comprising a housing, an electrical connection to the field bus, and an interface with at least one of the light source and the ballast,
   wherein the monitoring unit is powered by the filed bus via the electrical connection, and detects a status of the at least one of the light source and the ballast via the interface, the interface including a galvanically isolated connection of a sensor configured within said housing with at least a portion of the wiring disposed outside of the housing of the monitoring unit, and the detected status is based at least on said galvanically isolated connection with said portion of the wiring disposed outside of the housing of the monitoring unit.

14. The lighting system of claim 13, wherein the monitoring unit outputs information indicative of the status via the field bus.

15. The lighting system of claim 13, wherein the monitoring unit further includes a transceiver for outputting information indicative of the status via at least one of a wired or wireless communication.

16. A lighting system comprising:
a plurality of light sources;
a plurality of ballast connected to AC mains and providing power to the respective light sources;
a plurality of wirings electrically interconnecting each of the light sources and respective ballasts, and the AC mains;
a field bus; and
a plurality of monitoring units each comprising a housing, an electrical connection to the field bus, and an interface with the respective at least one of light sources and the ballasts,
wherein each of the monitoring units is powered by the filed bus via the electrical connection, and detects a status of the respective at least one of the light sources and the ballasts via the interface, the interface including a galvanically isolated connection of a sensor configured within said housing with at least a portion of the wirings interconnecting the respective at least one of the light sources and the ballasts, and the AC mains, said portion of the wirings disposed outside of the housing of the respective monitoring unit, and the detected status is based at least on said galvanically isolated connection with said portion of the wirings disposed outside of the housing of the respective monitoring unit.

17. The lighting system of claim 16, wherein each of the monitoring units outputs information indicative of the status via the field bus.

18. The lighting system of claim 16, wherein at least one of the monitoring units further includes a transceiver for outputting information indicative of the status via at least one of a wired or wireless communication.

19. The lighting system of claim 16, wherein each of at least two of the plurality of the monitoring units further includes a wireless transceiver for outputting information indicative of the status via a wireless communication.

20. The lighting system of claim 19, wherein the wireless communication includes at least one of a wireless mesh network, a web-based communication, a blue tooth, and a short-range or long-range radio frequency (RF) communication.

21. The lighting system of claim 19, wherein the monitoring units including the wireless transceiver for outputting information indicative of the status are configured for communication in a wireless self-healing mesh network.

22. A lighting system comprising:
a light source;
a ballast connected to AC mains and providing power to the light source;
a wiring electrically interconnecting the light source, the ballast and the AC mains;
a power line communication master; and
a monitoring unit comprising a housing, an electrical connection to the power line, and an interface with at least one of the light source and the ballast,
wherein the monitoring unit detects a status of the at least one of the light source and the ballast via the interface, the interface including a sensor configured within said housing in a galvanically isolated connection with at least a portion of the wiring disposed outside of the housing of the monitoring unit, and the detected status is based at least on said galvanically isolated connection with said portion of the wiring disposed outside of the housing of the monitoring unit, and
the monitoring unit communicates the detected status to the power line communication master in response to a polling request from the power line communication master.

23. The lighting system of claim 22, wherein the monitoring unit further comprising an interface, wherein operating parameters and addressing information enabling communication with the monitoring unit are configured via the interface.

24. The lighting system of claim 23, further comprising a user interface in wired or wireless communication with the power line communication master,
wherein the user interface selectively outputs information indicative of the status detected by the monitoring unit transmitted to the power line communication master in reply to the polling request.

25. The lighting system of claim 24, wherein the polling request results in continuous detecting of the status by the monitoring unit.

26. The lighting system of claim 24, wherein the polling request is selectively generated based on input via the user interface.

27. The lighting system of claim 22, wherein the monitoring unit includes a controller and a control circuit for selectively controlling operation of the light source.

28. The lighting system of claim 22, wherein the controller includes a microprocessor and a non-transient computer readable storage medium, and
the microprocessor is programmable to control the operation of the light source based on at least one of
control commands received from the power line communication master, and
the status detected by the monitoring unit.

29. A monitoring method comprising:
disposing a monitoring unit with respect to a wiring of an electrically powered device, said monitoring unit comprising a housing and a sensor configured within said housing of the monitoring unit;
sensing an AC current signal of said wiring of the electrically powered device via a galvanically isolated communication of said sensor with at least a portion of the wiring of the electrically powered device, said portion of the wiring disposed outside of the housing of the monitoring unit;
converting the sensed AC current into a DC voltage for analogue to digital signal conversion and averaging processing, and
deriving from the averaging processing monitoring data indicative of a status of the electrically powered device; and
outputting the monitoring data indicative of the status of the electrically powered device.

30. The monitoring method of claim 29, wherein
the averaging processing comprises acquiring samples of the signal at a sampling rate, summing the samples, and yielding the average value from the summing, and
the monitoring data is based on the average value.

* * * * *